United States Patent
Kaye et al.

(10) Patent No.: US 7,205,060 B2
(45) Date of Patent: Apr. 17, 2007

(54) METHOD AND SYSTEM FOR CONTROLLING FLUID DELIVERY IN A FUEL CELL

(75) Inventors: Ian W. Kaye, Livermore, CA (US); William R. DiScipio, Fremont, CA (US)

(73) Assignee: UltraCell Corporation, Livermore, CA (US)

( * ) Notice: Subject to any disclaimer, the term of this patent is extended or adjusted under 35 U.S.C. 154(b) by 0 days.

(21) Appl. No.: 11/193,303

(22) Filed: Jul. 29, 2005

(65) Prior Publication Data

US 2006/0029848 A1 Feb. 9, 2006

Related U.S. Application Data

(60) Provisional application No. 60/649,638, filed on Feb. 2, 2005, provisional application No. 60/677,424, filed on May 2, 2005, provisional application No. 60/682,598, filed on May 18, 2005, provisional application No. 60/638,421, filed on Dec. 21, 2004, provisional application No. 60/599,589, filed on Aug. 6, 2004.

(51) Int. Cl.
*H01M 8/04* (2006.01)
(52) U.S. Cl. .............................. 429/25; 429/24; 429/34
(58) Field of Classification Search ................. 429/22, 429/24, 34, 38, 39, 19, 13
See application file for complete search history.

(56) References Cited

U.S. PATENT DOCUMENTS

| | | |
|---|---|---|
| 2,770,969 A | 11/1956 | Cannell |
| 2,827,716 A * | 3/1958 | Reese ........................ 92/1 |
| 4,528,251 A | 7/1985 | Yamaguchi et al. |
| 4,904,547 A | 2/1990 | Mizumoto et al. |
| 5,081,095 A | 1/1992 | Bedford et al. |
| 5,525,436 A | 6/1996 | Savinell et al. |
| 5,534,328 A | 7/1996 | Ashmead et al. |
| 5,601,938 A | 2/1997 | Mayer et al. |
| 5,611,214 A | 3/1997 | Wegeng et al. |
| 5,641,585 A | 6/1997 | Lessing et al. |
| 5,716,727 A | 2/1998 | Savinell et al. |
| 5,766,786 A | 6/1998 | Fleck et al. |
| 5,789,093 A | 8/1998 | Malhi |
| 5,811,062 A | 9/1998 | Wegeng et al. |
| 5,961,930 A | 10/1999 | Chatterjee et al. |
| 5,961,932 A | 10/1999 | Ghosh et al. |
| 6,077,620 A | 6/2000 | Pettit |

(Continued)

OTHER PUBLICATIONS

Wackerle et al., "Sub-NL Flow Measurement Method for Microfluidic Actuators," Actuator 2000, Bremen, Jun. 19-21, 2000, pp. 1-4.

(Continued)

*Primary Examiner*—Raymond Alejandro
(74) *Attorney, Agent, or Firm*—Beyer Weaver LLP

(57) ABSTRACT

The invention relates to micro fuel cell systems whose performance is enhanced by an accurate fluid delivery system. The fluid delivery system improves reactant fluid provision to meet electrical output, while maintaining correct stoichiometries for chemical processing in a downstream reactor. The fluid delivery system includes a pressure source and a differential flow meter. The differential flow meter uses a flow restrictor and a sensor. The pressure source moves a fluid through the flow restrictor; the sensor detects differential pressure in the flow restrictor and outputs a signal that permits dynamic control of fluid flow, e.g., by controlling a pump.

30 Claims, 14 Drawing Sheets

U.S. PATENT DOCUMENTS

| | | | |
|---|---|---|---|
| 6,080,501 A | 6/2000 | Kelley et al. | |
| 6,193,501 B1 | 2/2001 | Masel et al. | |
| 6,200,536 B1 | 3/2001 | Tonkovich et al. | |
| 6,245,214 B1 | 6/2001 | Rehg et al. | |
| 6,268,077 B1 | 7/2001 | Kelley et al. | |
| 6,312,846 B1 | 11/2001 | Marsh | |
| 6,406,808 B1 | 6/2002 | Pratt et al. | |
| 6,415,860 B1 | 7/2002 | Kelly et al. | |
| 6,423,434 B1 | 7/2002 | Pratt et al. | |
| 6,447,945 B1 | 9/2002 | Streckert | |
| 6,460,733 B2 | 10/2002 | Acker et al. | |
| 6,465,119 B1 | 10/2002 | Koripella et al. | |
| 6,470,569 B1 | 10/2002 | Lippert et al. | |
| 6,537,506 B1 | 3/2003 | Schwalbe et al. | |
| 6,541,676 B1 | 4/2003 | Franz et al. | |
| 6,569,553 B1 | 5/2003 | Koripella et al. | |
| 6,638,654 B2 | 10/2003 | Jankowksi et al. | |
| 6,673,130 B2 | 1/2004 | Jankowski et al. | |
| 6,753,036 B2 | 6/2004 | Jankowski et al. | |
| 6,783,879 B2 | 8/2004 | Skala et al. | |
| 6,821,666 B2 | 11/2004 | Morse et al. | |
| 6,828,049 B2 | 12/2004 | Bullock | |
| 6,890,674 B2 | 5/2005 | Beckmann et al. | |
| 6,916,568 B2 | 7/2005 | Guan | |
| 2001/0029974 A1 | 10/2001 | Cohen et al. | |
| 2002/0012825 A1 | 1/2002 | Sasahara et al. | |
| 2002/0045082 A1 | 4/2002 | Marsh | |
| 2002/0076599 A1 | 6/2002 | Neutzler et al. | |
| 2002/0081468 A1 | 6/2002 | Shioya | |
| 2002/0094462 A1 | 7/2002 | Shioya et al. | |
| 2002/0098119 A1 | 7/2002 | Goodman | |
| 2002/0106540 A1 | 8/2002 | Shioya | |
| 2002/0127141 A1 | 9/2002 | Acker | |
| 2002/0131915 A1 | 9/2002 | Shore et al. | |
| 2002/0132156 A1 | 9/2002 | Ruhl et al. | |
| 2002/0147107 A1 | 10/2002 | Abdo et al. | |
| 2002/0150804 A1 | 10/2002 | Srinivasan et al. | |
| 2002/0155335 A1 | 10/2002 | Kearl | |
| 2002/0187374 A1 | 12/2002 | Yamauchi et al. | |
| 2002/0192537 A1 | 12/2002 | Ren | |
| 2003/0003334 A1* | 1/2003 | Yoshizawa et al. | 429/22 |
| 2003/0006668 A1 | 1/2003 | Lal et al. | |
| 2003/0027022 A1 | 2/2003 | Arana et al. | |
| 2003/0031910 A1 | 2/2003 | Satou et al. | |
| 2003/0031913 A1 | 2/2003 | Pavio et al. | |
| 2003/0035986 A1* | 2/2003 | Yang | 429/25 |
| 2003/0057199 A1 | 3/2003 | Villa et al. | |
| 2003/0091502 A1 | 5/2003 | Holladay et al. | |
| 2003/0129464 A1 | 7/2003 | Becerra et al. | |
| 2003/0157385 A1 | 8/2003 | Beckmann et al. | |
| 2003/0157389 A1 | 8/2003 | Kornmayer | |
| 2003/0194363 A1 | 10/2003 | Koripella | |
| 2003/0224231 A1 | 12/2003 | Penev | |
| 2004/0009381 A1 | 1/2004 | Sakai et al. | |
| 2004/0072049 A1 | 4/2004 | Becerra et al. | |
| 2004/0086755 A1 | 5/2004 | Kalal | |
| 2004/0115495 A1 | 6/2004 | Asai et al. | |
| 2004/0265650 A1 | 12/2004 | Koo | |
| 2005/0053808 A1 | 3/2005 | Chang et al. | |

OTHER PUBLICATIONS

Fraunhofer Institut Zuverlassigkeit und Mikrointegration, "Flow Sensor based on the differential pressure principle (Type 1)," product information datasheet.

U.S. Appl. No. 10/131,846, entitled: Microfluidic Fuel Cell Systems with Embedded Materials and Structures and Method Thereof, by inventors: Morse, filed Apr. 24, 2002.

U.S. Appl. No. 10/261,353, entitled: Bonded Polyimide Fuel Cell Package and Method Thereof, by inventors: Morse, filed Sep. 30, 2002.

U.S. Appl. No. 10/371,876, entitled: Metal Hydride Fuel Storage and Method Thereof, by inventors: Morse, filed Feb. 21, 2003.

U.S. Appl. No. 10/612,177, entitled: Vapor-deposited Porous Films for Energy Conversion, by inventors: Jankowski, filed Jul. 1, 2003.

U.S. Appl. No. 10/637,914, entitled: Solid Oxide MEMS-based Fuel Cells, by inventors: Jankowski, filed Aug. 8, 2003.

U.S. Appl. No. 10/637,915, entitled: Solid Polymer MEMS-based Fuel Cells, by inventors: Jankowski, filed Aug. 8, 2003.

U.S. Appl. No. 10/783,230, entitled: Method for Fabrication of Electrodes, by inventors: Jankowski, filed Feb. 19, 2004.

U.S. Appl. No. 10/853,859, entitled: Microfluidic Systems with Embedded Materials and Structures and Method Thereof, by inventors: Morse, filed May 25, 2004.

U.S. Appl. No. 10/877,769, entitled "Micro Fuel Cell System Start Up and Shut Down Systems and Methods", by inventors: Kaye, filed Jun. 25, 2004.

U.S. Appl. No. 10/877,770, entitled "Micro Fuel Cell Thermal Management", by inventors: Kaye, filed Jun. 25, 2004.

U.S. Appl. No. 10/877,771, entitled "Efficient Micro Fuel Cell Systems and Methods", by inventors: Kaye, filed Jun. 25, 2004.

U.S. Appl. No. 10/877,824, entitled "Micro Fuel Cell Architecture", by inventors: Kaye, filed Jun. 25, 2004.

U.S. Appl. No. 10/007,412, entitled "Chemical Microreactor and Method Thereof", by inventors: Morse, filed Dec. 5, 2001.

International Search Report and Written Opinion for corresponding PCT Application No. PCT/US05/26924 dated Sep. 6, 2006.

* cited by examiner

METHOD AND SYSTEM FOR CONTROLLING FLUID DELIVERY IN A FUEL CELL

CROSS-REFERENCE TO RELATED APPLICATIONS

This application claims priority under 35 U.S.C. §119(e) to: i) U.S. Provisional Patent Application No. 60/599,589 filed on Aug. 6, 2004 entitled "Method and System for Controlling a Micro Fluid Delivery System", ii) U.S. Provisional Patent Application No. 60/638,421 filed on Dec. 21, 2004 entitled "Micro Fuel Cell Architecture", iii) U.S. Provisional Patent Application No. 60/649,638 filed on Feb. 2, 2005 entitled "Heat Efficient Micro Fuel Cell System", iv) U.S. Provisional Patent Application No. 60/677,424 filed on May 2, 2005 entitled "Micro Fuel Cell Fuel Cartridge Apparatus", and v) U.S. Provisional Patent Application No. 60/682,598 filed on May 18, 2005 entitled "Fuel Storage Devices for Use with Micro Fuel Cells"; each of these patent applications is incorporated by reference in its entirety for all purposes.

BACKGROUND OF THE INVENTION

The present invention relates to fuel cell and microfluidic technology. In particular, the invention relates to systems and methods of controlling reactant fluids and pumps in micro fuel cell systems.

A fuel cell electrochemically combines hydrogen and oxygen to generate electrical energy. Commercially available fuel cell systems are still restricted to large-scale applications, such as industrial size generators for electrical power back up. Consumer electronics devices and other portable electrical power applications currently rely on lithium ion and similar battery technologies. Portable fuel cell systems offer extended usage times over batteries and would be desirable, but are not yet available.

The air readily provides oxygen; hydrogen requires a dedicated source. A portable storage device offers a replenishable hydrogen supply, and may include an outlet that detachably couples to the fuel cell system and allows the storage device to be replaced when depleted. The hydrogen supply may include a direct hydrogen supply or a 'reformed' hydrogen supply. A direct hydrogen supply employs a pure source, such as compressed hydrogen in a pressurized container, or a solid-hydrogen storage system, such as a metal-based hydrogen storage device. A reformed fuel cell system processes a hydrogen fuel source to produce hydrogen. The fuel source acts as a carrier for hydrogen, is manipulated to separate hydrogen, and may include a hydrocarbon fuel, hydrogen bearing fuel stream, or other hydrogen fuel source such as ammonia. Liquid fuel sources offer high energy densities and the ability to be readily stored and shipped.

One or more pumps move reactants into the fuel cell system. Portable and micro fuel cell systems use low flow rates, typically less than 5 milliliters per minute of methanol based fuels for example. Such low flow complicates accurate control—yet the fuel cell system imposes tight demands on hydrogen supply. At the least, the system must ensure that the hydrogen supply flow rate satisfies power generation in the fuel cell to meet electrical demand. The flow should also maintain correct stoichiometries for fuel processing in a reformed system; underflow may lead to an individual cell or two "going negative", meaning that it can no longer sustain a reaction rate commensurate with the rest of the cells in a stack. Under these conditions, one or more cells in the stack may be damaged and need replacement before the stack operates properly again.

Commercially available low flow rate pumps do not provide suitable accuracy for portable fuel cell systems. Based on the foregoing, alternate techniques for reactant supply and fluid control in micro fuel cell systems are needed.

SUMMARY OF THE INVENTION

The present invention relates to micro fuel cell systems whose performance is enhanced by an accurate fluid delivery system. The fluid delivery system improves reactant fluid provision to meet electrical output, while maintaining correct stoichiometries for chemical processing in a downstream reactor.

In one aspect, the present invention relates to a fuel cell system for generating electrical energy. The fuel cell system includes a differential flow meter that includes a flow restriction and at least one sensor configured to measure differential pressure in a fluid between two locations of the differential flow meter. The fuel cell system also includes a pressure source that moves the fluid to the differential flow meter before use of the fluid in the fuel cell system. The fuel cell system further includes a controller configured to convert a signal output by the sensor to a command that affects flow rate of the fluid. The fuel cell system additionally includes a fuel cell configured to receive oxygen and hydrogen and to generate electrical energy.

In another aspect, the present invention relates to a fuel cell system. The fuel cell system includes a storage device that stores a fuel source and a fuel processor that processes the fuel source to output hydrogen. The fuel cell system also includes a differential flow meter that includes a flow restriction and at least one sensor. The fuel cell system further includes a pressure source, a controller, and a fuel cell.

In yet another aspect, the present invention relates to a fuel cell system. The fuel cell system includes a pressure source configured to move hydrogen at a flow rate that is less than about 60 milliliters per minute per watt output by the fuel cell.

In still another aspect, the present invention relates to a fuel cell system. The fuel cell system includes a pressure source configured to move a liquid fuel source at a flow rate that is less than about 1 milliliter per hour per watt output by the fuel cell.

In still another aspect, the present invention relates to a method for controlling fluid delivery in a fuel cell system. The method includes moving a fluid at a predetermined flow rate. The method also includes flowing the fluid through a differential flow meter that includes a flow restriction and at least one sensor configured to measure differential pressure in the fluid between two locations of the differential flow meter. The method further includes detecting differential pressure of the fluid between two locations of the differential flow meter while the fluid is in the differential flow meter. The method additionally includes determining flow rate of the fluid using the differential pressure and changing the flow rate of the fluid.

These and other features of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Overview

Micro fuel cell systems generate dc voltage, which may be used in a wide variety of applications. For example, electrical energy generated by a fuel cell may power a notebook computer or an electronics device carried by military personnel. In one embodiment, the present invention provides 'small' fuel cells that are configured to output less than 200 watts of power (net or total). Fuel cells of this size are commonly referred to as 'micro fuel cells'. and are well suited for use with portable electronics devices. In one embodiment, the fuel cell is configured to generate from about 1 milliwatt to about 200 Watts. In another embodiment, the fuel cell generates from about 5 Watts to about 60 Watts. The fuel cell system may be a stand-alone system, which is a single package that produces power as long as it has access to a) oxygen and b) hydrogen or a hydrogen source such as a hydrocarbon fuel. One specific portable fuel cell package produces about 20 Watts or about 45 Watts, depending on the number of cells in the stack.

The fluid delivery system includes a pressure source and a differential flow meter. The pressure source may include a pump or a pressurized bladder in a storage device. The differential flow meter uses a flow restrictor and a sensor. The pressure source moves a fluid through the flow restrictor; the sensor detects differential pressure in the flow restrictor and outputs a signal that permits dynamic control of fluid flow, e.g., by controlling a pump or valve. A differential pressure sensor measures the pressure drop across the flow restrictor, and this pressure drop can be used to determine flow rate across the restrictor. A linear or polynomial equation, for example, may be used to assess flow rate based on a measured differential pressure across the restrictor. The flow restrictor increases readability of the fluid flow, which improves feedback and control accuracy in a micro fuel cell system where flow rates are small.

Fluids controlled in this manner may include any fluid inlet to a micro fuel cell system. Suitable reactants include oxygen or air, hydrogen, a hydrogen source such as a hydrocarbon fuel, etc. Other examples are suitable for use and several are provided below. As the term is used herein, a 'fluid' may include a liquid (Newtonian or other), gas (including heated vapors for a liquid), or combinations thereof.

Fuel Cell System

Figure 1A:
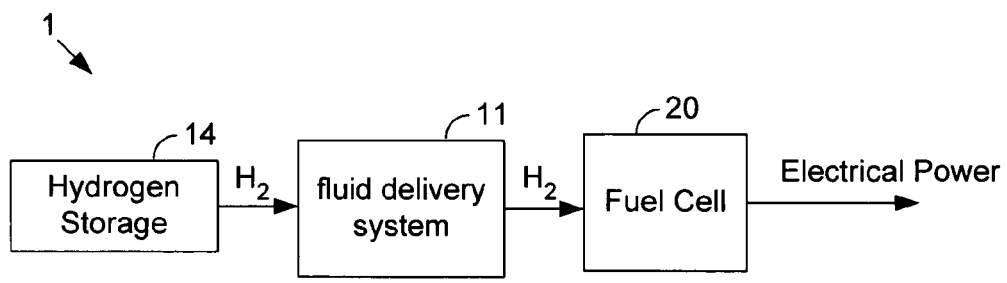
FIG. 1A illustrates a fuel cell package for producing electrical energy in accordance with one embodiment of the present invention.

FIG. 1A illustrates a fuel cell system 1 for producing electrical energy in accordance with one embodiment of the present invention. Fuel cell system 1 comprises a fuel cell 20 and a hydrogen storage device 14.

Hydrogen storage device 14 stores and outputs hydrogen, which may be a pure source such as compressed hydrogen stored in a container. Hydrogen storage device 14 may also include a solid-hydrogen storage system such as a metal or carbon-based hydrogen storage device known to those of skill in the art. An outlet of hydrogen storage device 14 detachably couples to fuel delivery system 15 (or some intermediate line or plumbing) so that storage device 14 may be replaced when depleted. Hydrogen storage device 14 may be a single use device or reusable.

Fuel delivery system 11 transfers hydrogen from storage device 14 to fuel cell 20. Fuel delivery system 11 may also regulate oxygen provision to fuel cell 20. Fuel delivery system 11 may include a pressure source such as a pump, one or more tubes (or 'lines') that communicate a fluid (liquid and/or gas), a differential flow meter, a sensor, one or more valves such as a shutoff valve, and other plumbing components. Fuel delivery system 11 will be described in further detail below.

Fuel cell 20 electrochemically converts hydrogen and oxygen to water, generating electrical energy and heat in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications such as consumer electronics. An ion conductive membrane fuel cell comprises a membrane electrode assembly that carries out the electrical energy generating electrochemical reaction. The membrane electrode assembly includes a hydrogen catalyst, an oxygen catalyst, and an ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. A membrane electrode assembly is disposed between two bi-polar plates. Hydrogen distribution occurs via a channel field on one plate while oxygen distribution occurs via a channel field on a second plate on the other side of the membrane electrode assembly. Specifically, a first channel field distributes hydrogen to the hydrogen gas distribution layer, while a second channel field distributes oxygen to the oxygen gas distribution layer. The term 'bi-polar' refers electrically to a bi-polar plate (whether comprised of one plate or two plates) sandwiched between two membrane electrode assembly layers. In the stack, the bi-polar plate acts as both a negative terminal for one adjacent (e.g., above) membrane electrode assembly and a positive terminal for a second adjacent (e.g., below) membrane electrode assembly arranged on the opposite face of the bi-polar plate.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add electrical potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst separates the hydrogen into protons and electrons. An ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates, where each bi-polar plate is formed from a single sheet of metal. Each plate includes channel fields on opposite surfaces of the thin metal sheet. The single bi-polar plate thus dually distributes hydrogen and oxygen: one channel field distributes hydrogen while a channel field on the opposite surface distributes oxygen. Multiple bi-polar plates can be stacked to produce a 'fuel cell stack' in which a membrane electrode assembly is disposed between each pair of adjacent bi-polar plates. In another embodiment, each bi-polar plate is formed from multiple layers that include more than one sheet of metal.

Since the electrical generation process in fuel cell 20 is exothermic, fuel cell 20 may implement a thermal management system to dissipate heat. Fuel cell 20 may also employ a number of humidification plates (HP) to manage moisture levels in the fuel cell.

While the present invention will mainly be discussed with respect to PEM fuel cells, it is understood that the present invention may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may be applicable to the fluid control designs described herein. Other such fuel cell architectures include direct methanol, alkaline and molten carbonate fuel cells, for example.

Figure 1B:
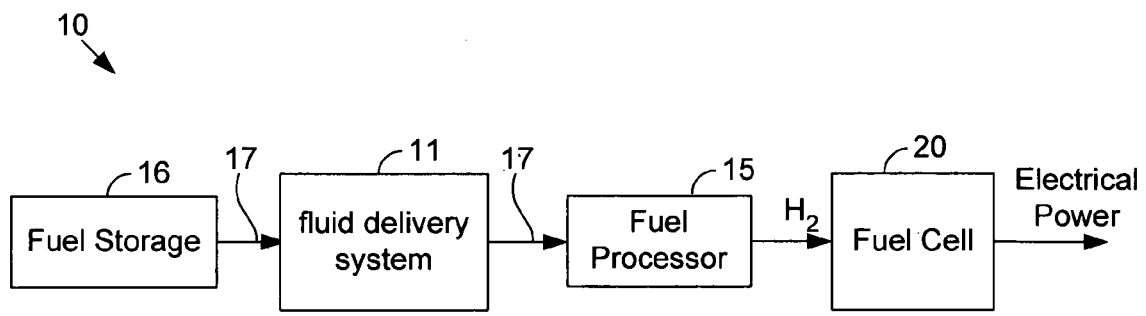
FIG. 1B illustrates a fuel cell package including a fuel processor in accordance with another embodiment of the present invention.

A fuel cell system of the present invention may also use a 'reformed' hydrogen supply. FIG. 1B illustrates a fuel cell system 10 for producing electrical energy in accordance with another embodiment of the present invention. Fuel cell system 10 differs from system 1 in that it reforms a fuel source to provide hydrogen. Fuel cell system 10 comprises a fuel processor 15, fuel delivery system 11 and a fuel cell 20. Fuel cell 20 was described above, and fuel delivery system 111 will be described further below.

Fuel processor 15 processes a fuel source 17 to produce hydrogen. Fuel source 17 acts as a carrier for hydrogen and can be manipulated to separate hydrogen. Fuel source 17 may include any hydrogen bearing fuel stream, hydrocarbon fuel, or other hydrogen fuel source. Hydrocarbon fuel sources 17 suitable for use with the present invention include methanol, ethanol, gasoline, propane, butane and natural gas, for example. Other fuel sources may be used with a fuel cell package of the present invention, such as sodium borohydride. Several hydrocarbon and ammonia products may also be used.

Fuel source 17 may be stored as a fuel mixture. When the fuel processor 15 comprises a steam reformer, storage device 16 contains a fuel mixture of a hydrocarbon fuel source and water. Hydrocarbon fuel source/water fuel mixtures are frequently represented as a percentage fuel source in water. In one embodiment, fuel source 17 comprises methanol or ethanol concentrations in water in the range of 1%–99.9%. Other liquid fuels such as butane, propane, gasoline, military grade "JP8" etc. may also be contained in storage device 16 with concentrations in water from 5–100%. In a specific embodiment, fuel source 17 includes 67% methanol by volume.

As shown, the reformed hydrogen supply comprises a fuel processor 15 and a fuel source storage device 16. Storage device 16 stores fuel source 17, and may comprise a refillable and/or disposable (single use) fuel cartridge. Either cartridge offers a user instant recharging. Both types of cartridges may also be either vented or non-vented. Vented cartridges include a small hole, single direction flow valve, hydrophobic filter or other configuration to allow air to enter the fuel cartridge as liquid is displaced from the cartridge. Non-vented cartridges may rely on an internal bladder disposed within a vented outer case. The bladder is a sealed fuel container that prevents air and fuel from mixing as fuel is displaced, and the outer case provides mechanical strength to the cartridge. This type of cartridge allows for "orientation" independent operation. Non-vented cartridges may also be pressurized, by eliminating the vent hole in the outer case, and substituting a pressure source such as from a propellant like propane or compressed nitrogen gas for example, or a pressurized process gas used on other fluid streams within the fuel cell system, such as the cathode air inlet gas stream for example. Other suitable designs include other components such as wicks that move a liquid fuel from locations within a fuel cartridge to a cartridge exit.

Fuel processor 15 processes the hydrocarbon fuel source 17 and outputs hydrogen. A hydrocarbon fuel processor 15 heats and processes a hydrocarbon fuel source 17 in the presence of a catalyst to produce hydrogen. Fuel processor 15 comprises a reformer, which is a catalytic device that converts a liquid or gaseous hydrocarbon fuel source 17 into hydrogen and carbon dioxide. As the term is used herein, reforming refers to the process of producing hydrogen from a fuel source. One suitable fuel processor 15 is described in further detail below.

In one embodiment, fuel processor 15 is a steam reformer that only needs steam and fuel to produce hydrogen. Several types of reformers suitable for use in fuel cell system 10 include steam reformers, auto thermal reformers (ATR) or catalytic partial oxidizers (CPOX). ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280° C. or less and allows fuel cell system 10 use in low temperature applications.

A fuel cell 20 may be configured to receive hydrogen from either a direct hydrogen supply 12 or a reformed source. Fuel cell 20 typically receives hydrogen from one supply at a time, although fuel cell packages that employ redundant hydrogen provision from multiple supplies are useful in some applications.

Regardless of the fuel cell system design, the system requires reactant fluid provision. Fluid delivery system 11 thus provides one or more reactant fluids to the corresponding locations in a fuel cell system. As can be seen from the above two systems, there are several fluids that fluid delivery system 11 can deliver, and several locations where the fluid delivery system 11 can be situated to do so.

Figure 1C:
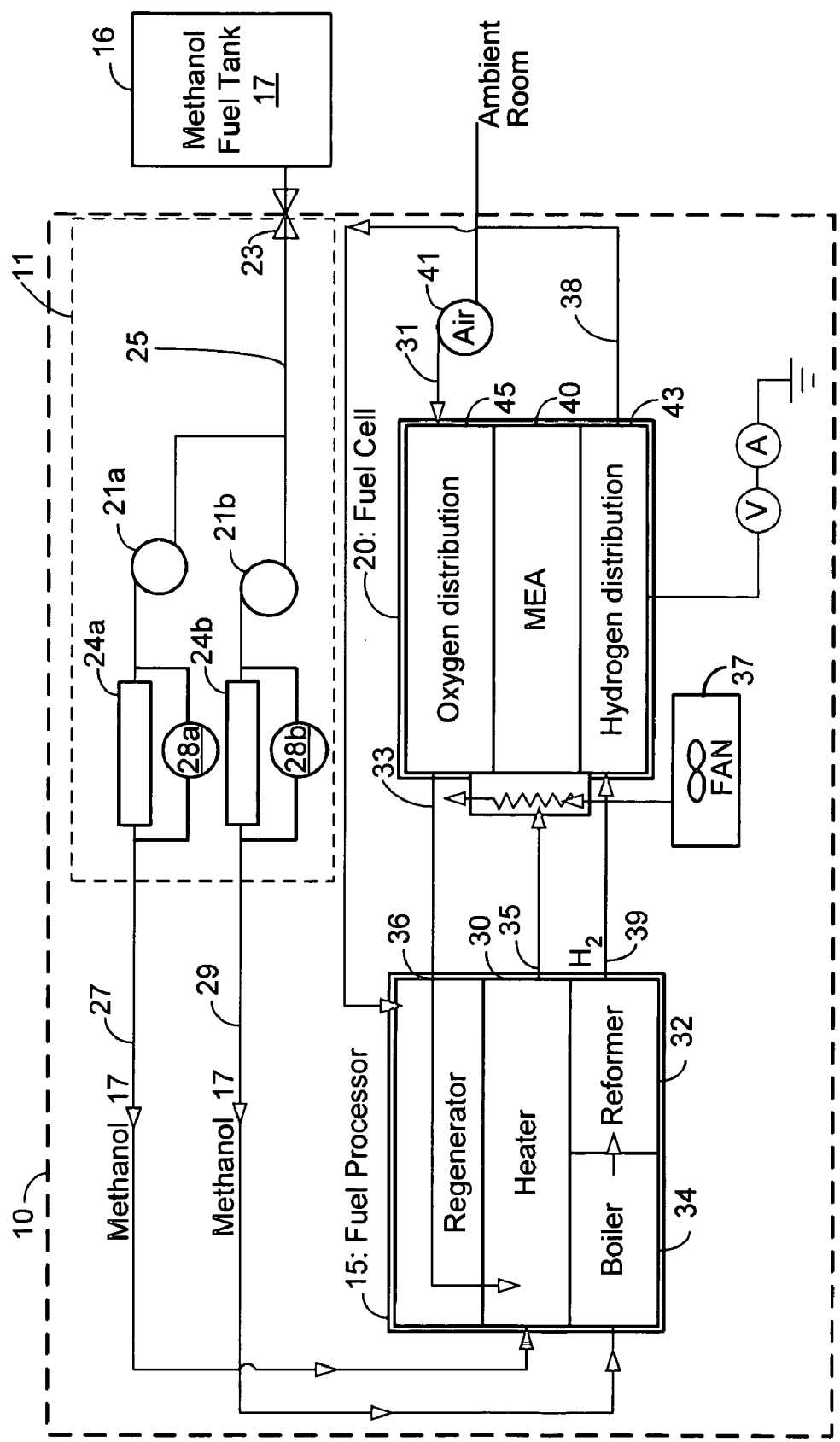
FIG. 1C illustrates schematic operation for the fuel cell package of FIG. 1B in accordance with a specific embodiment of the present invention.

FIG. 1C illustrates schematic operation for the fuel cell system 10 of FIG. 1B in accordance with a specific embodiment of the present invention. As shown, system 10 includes a fluid delivery system 11 for fuel source provision, fuel processor 15, fuel cell 20 and an air pump 41. A fuel container 16 couples to system 10 and stores fuel source 17.

Fuel container 16 stores methanol or a methanol mixture as a hydrogen fuel source 17. An outlet of fuel container 16 couples to quick disconnect 23, which communicates methanol 17 into hydrogen fuel source line 25. In one embodiment, quick disconnect 23 is included in fluid delivery system 11 and permits detachable coupling between a fuel container 16 and a package that includes fuel cell 20 and fuel processor 15. In this case, line 25 is internal to the package.

Fluid delivery system 11 regulates methanol supply into system 10. Within fluid delivery system 11, line 25 divides into two lines: a first line 27 that transports methanol 17 to a heater (also referred to herein as a 'burner') 30 for fuel processor 15 and a second line 29 that transports methanol 17 to a reformer 32 in fuel processor 15. Lines 25, 27 and 29 may comprise channels disposed in the fuel processor or tubes leading thereto, for example.

Flow control is provided on each line 27 and 29. Separate pumps 21a and 21b are provided for lines 27 and 29, respectively, to pressurize each line separately and transfer methanol at independent rates, if desired. A model 030SP-S6112 pump as provided by Biochem, N.J. is suitable to transmit liquid methanol on either line in a specific embodiment. A flow restriction 24a and 24b and sensor 28a and 28b are also provided on each line 27 and 29, respectively. Each sensor 28, situated between storage device 16 and fuel processor 18, detects pressure for methanol 17 flow through its corresponding restriction 24 as the methanol transfers between storage device 16 and fuel processor 18. The sensor 28 then outputs a signal indicative of detected pressure. In conjunction with suitable control, such as digital control applied by a processor that implements instructions from stored software, each pump 21 responds to control signals from the processor and moves a desired amount of methanol 17 from storage device 16 to reformer 32 on each line 27 and 29. The interaction of pump 21, flow restriction 24 and a sensor are described in further detail below with respect to FIGS. 2A–C. In one embodiment, the control system knows how much fuel is being pumped, and the control system communicates this information to a chip on storage device 16.

Air pump 41 delivers oxygen and air from the ambient room through line 31 to the cathode in the fuel cell 20, where some oxygen is used in the cathode to generate electricity. Air pump 41 may include a fan, blower or compressor, for example. High operating temperatures in fuel cell 20 also heat the oxygen and air. In the embodiment shown, the heated oxygen and air is then transmitted via line 33 to regenerator 36 of fuel processor 15, where it is additionally heated before entering heater 30. This double pre-heating increases efficiency of the fuel cell system by a) reducing heat lost to reactants in heater 30 (such as fresh oxygen that would otherwise be near room temperature), b) cooling the fuel cell during energy production. In this embodiment, a model BTC compressor as provided by Hargraves, N.C. is suitable to pressurize oxygen and air for fuel cell system 10.

A fan 37 blows cooling air (e.g. from the ambient room) over fuel cell 20. Fan 37 may be suitable sized to move air as desired by heating requirements of the fuel cell; and many vendors known to those of skill in the art provide fans suitable for use with package 10.

Fuel processor 15 receives methanol 17 and outputs hydrogen. Fuel processor 15 comprises heater 30, reformer 32, boiler 34 and regenerator 36. Heater (or burner) 30 includes an inlet (which may be extended to include a boiler in some cases) that receives methanol 17 from line 27 and a catalyst that generates heat with methanol presence. Boiler 34 includes an inlet that receives methanol 17 from line 29. The structure of boiler 34 permits heat produced in heater 30 to heat methanol 17 in boiler 34 before reformer 32 receives the methanol 17. Boiler 34 includes an outlet that provides heated methanol 17 to reformer 32. Reformer 32 includes an inlet that receives heated methanol 17 from boiler 34. A catalyst in reformer 32 reacts with the methanol 17 and produces hydrogen and carbon dioxide. This reaction is slightly endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium or platinum, that is preferential to carbon monoxide over hydrogen.

Regenerator 36 pre-heats air before the air enters heater 30. Regenerator 36 also reduces heat loss from package 10 by heating air before the heat escapes fuel processor 15. In one sense, regenerator uses waste heat in fuel processor 15 to increase thermal management and thermal efficiency of the fuel processor. Specifically, waste heat from heater 30 pre-heats incoming air provided to heater 30 to reduce heat transfer to the air in the heater so more heat transfers to reformer 32. The regenerator also functions as insulation for the fuel processor, by reducing the overall amount of heat loss of the fuel processor.

Line 39 transports hydrogen from fuel processor 15 to fuel cell 20. In a specific embodiment, gaseous delivery lines 31, 33 and 39 include channels in a metal interconnect that couples to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. An anode exhaust manifold 38 collects gases from the hydrogen distribution channels and delivers them to the ambient room, or back to the fuel processor. A cathode exhaust manifold collects gases from the oxygen distribution channels and delivers them to a cathode exhaust port and line 33, or to the ambient room.

In addition to the components shown in shown in FIG. 1C, system 10 may also include other elements such as electronic controls, additional pumps and valves, added system sensors, manifolds, heat exchangers and electrical interconnects useful for carrying out functionality of a fuel cell system 10 that are known to one of skill in the art and omitted herein for sake of brevity.

FIG. 1C shows one specific plumbing arrangement for a fuel cell system; other plumbing arrangements are suitable for use herein. In a specific embodiment, line 29 runs inlet methanol 17 across a heat exchanger that receives heat from the exhaust of the heater 30 in fuel processor 15. This increases thermal efficiency for the system by preheating the incoming fuel source (to reduce heating in the burner 30) and recuperates heat that would otherwise be expended from the system. In another specific embodiment, the exhaust of the heater 30 in fuel processor 15 is carried to one or more heat transfer appendages in fuel cell 20 during system start-up to expedite reaching initial elevated operating temperatures in the fuel cell 20. An additional fan may also be used to blow air over one or more heat transfer appendages that permit conductive heat transfer with internal portions of a fuel cell stack. This provides dedicated cooling of the stack.

Fluid Delivery System

Figure 2A:
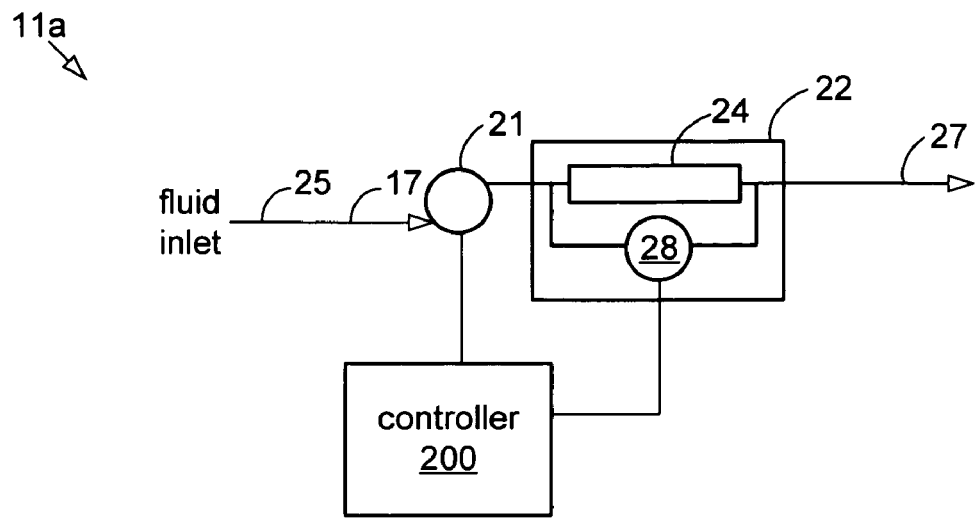
FIGS. 2A–2C illustrate fuel delivery systems in accordance with several embodiments of the present invention.

FIG. 2A shows a fluid delivery system 11a in accordance with one embodiment of the present invention. Fluid delivery system 11a is well suited for accurately delivering a methanol fuel mixture from a cartridge or other portable storage device to a micro fuel cell system. Although the present invention will now primarily be discussed with respect to movement of liquid methanol, it is understood that fluid control systems described herein are well suited for use with gases and other liquids used in a fuel cell system, such as any fuel source or reactant (hydrogen, oxygen, etc.) in a fuel cell or fuel processor. Fluid delivery system 11a includes an inlet line 25, pump 21, a differential flow meter 22 that includes flow restriction 24 and sensor 28, a controller 200, and outlet line 27.

Pump 21 pressurizes methanol 17 and moves it from inlet line 25 to differential flow meter 22, before use of methanol 17 in one or more desired downstream components via outlet line 27. For system 10 of FIG. 1C, pump 21b moves methanol 17 from storage device 16 to the reformer 32 in fuel processor 15 and through any plumbing between the source and destination. Similarly, pump 21a moves fuel source 17 from storage device 16 to a heater in processor 15 and through any plumbing therebetween. Pump 21 may include any suitable design, such as a diaphragm, screw type, electro-static, field-induced, peristaltic, piezo-actuated, piston, MEMS, roots, electrostatic, electrohydrodynamic rotary vane, centrifugal, solenoid, syringe or gear pump, for example. Other pump types are suitable for use herein.

The present invention is well suited for use with low volume fluid pumps ("micro pumps"). Flow rates for a micro pump are typically small and may vary based on the fuel cell system and whether the fluid being pumped is a liquid or gas.

A liquid fuel source 17 is common when the fuel source is stored in a portable storage device and pumped to a fuel processor for production of hydrogen. In one embodiment, pump 21 is a micro-pump configured to move a liquid fuel source 17 at a flow rate that is less than about 4 milliliters per hour per watt output by the fuel cell. In a specific embodiment, the fuel source is liquid methanol (which includes methanol mixtures) and pump 21 is configured to move less than about 1 milliliter per hour per watt. Thus, one fuel cell system that includes a 45 watt fuel cell may use a micro pump that moves about 45 milliliters per hour of methanol to a fuel processor, while a 200 watt fuel cell may use a micro pump that moves about 200 milliliters per hour of methanol. These flow rates may vary with size, design, and efficiency of the fuel cell system and its components; other liquid flow rates are suitable for use herein. For example, flow rates may be larger or smaller than those provided above based on the hydrocarbon fuel source/water mixture ratio, efficiency of the fuel processor and fuel cell, ambient temperature, ambient pressure, number of start/stop cycles on the system, total number of operating hours on the system, efficiency of the power regulation circuits etc.

Volumetric flow rates are typically higher for gases than liquids. Two common reactant gases used in a fuel cell system are oxygen and hydrogen. In one embodiment when fluid delivery system 11a moves air for oxygen supply, pump 21 is configured to move the air at a flow rate that is less than about 0.25 liters per minute per watt output by the fuel cell. In a specific embodiment, an airflow rate of less than about 0.12 liters per minute per watt is suitable. For example, a 10-watt fuel cell may draw about 1.2 liters per minute of air and oxygen. Other oxygen flow rates may be used and will vary, for example, if the air is used for other purposes such as cooling, providing additional oxygen to down stream components such as a catalytic heater located in the same fluidic path downstream of the fuel cell cathode, or supplying additional air to a separate reactor such as a preferential oxidizer: (PROX) located upstream of the fuel cell in a separate fluidic path (e.g., the fuel side or hydrogen path of the fuel cell). Additionally, flow rates may be larger or smaller than those provided above based on the hydrocarbon fuel source/water mixture ratio, efficiency of the fuel processor and fuel cell, ambient temperature, ambient pressure, number of start/stop cycles on the system, total number of operating hours on the system, efficiency of the power regulation circuits etc. For example a 45 W fuel cell system operating at 10,000 ft altitude may require up to 8 liters per minute of air during steady state conditions. The volumetric air flow may also be sized to accommodate startup of the system such as in the case of a reformed methanol fuel cell system where the air flow is used to heat up and cool down the fuel processor; in some instances, the fuel cell stack may not be producing any power during heat up and cool down. For example a 10 W reformed methanol fuel cell system may require 6 liters per minute during startup conditions.

Accurate control of hydrogen flow rates is common for a direct hydrogen supply system (see FIG. 1A for example). In one embodiment when fluid delivery system 11a moves hydrogen gas, pump 21 is configured to move the hydrogen gas at a flow rate that is less than about 60 milliliters per minute per watt output by the fuel cell. In a specific embodiment, a hydrogen flow rate of less than about 18 milliliters per minute per watt is suitable. For example, a 60-watt fuel cell may draw about 1.2 liters per minute of hydrogen. Other hydrogen flow rates may be used and will vary, for example, based on fuel cell efficiency, type of fuel cell, membrane electrode assembly materials and catalysts, ambient temperature, ambient pressure, number of start/stop cycles on the system, total number of operating hours on the system, efficiency of the power regulation circuits etc.

Fluid delivery system 11a also includes a differential flow meter 22 that includes a flow restriction 24 and at least one sensor 28 that measures differential pressure across the differential flow meter. The flow restriction 24 alters fluid flow through its structure and improves detection of the low flow rate using a sensor.

In one embodiment, flow restriction 24 includes an orifice with a smaller opening (e.g., diameter) than a line (such as line 25 or another intermediate tube or line) that supplies the fuel source to the flow restriction. The smaller diameter increases flow rate in the flow restriction and improves detection of the low flow rate. In a specific embodiment, the orifice has a diameter that is less than about 0.002 inches. Other orifice sizes may be used and will vary for example, on viscosity of the fluid and whether the fluid is a liquid or a gas. Examples of different orifice diameters, pressure drops and flow rates are shown in the tables 1 and 2.

TABLE 1 a.

| Orifice Diameter (in) | 67% Methanol Flow ml/hr | Desired Pressure Drop [psig] | Tube ID [inch] | Ratio Inlet ID/Orifice ID |
|---|---|---|---|---|
| 0.0088 | 200 | 0.5 | 0.032 | 3.61696005 |
| 0.0048 | 60 | 0.5 | 0.064 | 13.20727072 |
| 0.0034 | 30 | 0.5 | 0.032 | 9.338950691 |
| 0.0024 | 15 | 0.5 | 0.064 | 26.41454145 |

TABLE 1-continued a.

| Orifice Diameter (in) | 67% Methanol Flow ml/hr | Desired Pressure Drop [psig] | Tube ID [inch] | Ratio Inlet ID/Orifice ID |
|---|---|---|---|---|
| 0.0063 | 200 | 1 | 0.032 | 5.115153957 |
| 0.0034 | 60 | 1 | 0.064 | 18.67790138 |
| 0.0024 | 30 | 1 | 0.032 | 13.20727072 |
| 0.0017 | 15 | 1 | 0.064 | 37.35580276 |
| 0.0028 | 200 | 5 | 0.032 | 11.43783196 |
| 0.0015 | 60 | 5 | 0.064 | 41.76505717 |
| 0.0011 | 30 | 5 | 0.032 | 29.53235514 |
| 0.0008 | 15 | 5 | 0.064 | 83.53011433 |

TABLE 2 b.

| P2-P1 [psig] | Orifice Dia [inch] | 67% methanol flow [ml/hr] |
|---|---|---|
| 4.74 | 0.0017 | 70 |
| 4.40 | 0.0017 | 65 |
| 4.06 | 0.0017 | 60 |
| 3.72 | 0.0017 | 55 |
| 3.39 | 0.0017 | 50 |
| 3.05 | 0.0017 | 45 |
| 2.71 | 0.0017 | 40 |
| 2.37 | 0.0017 | 35 |
| 2.03 | 0.0017 | 30 |
| 1.69 | 0.0017 | 25 |
| 1.35 | 0.0017 | 20 |
| 1.02 | 0.0017 | 15 |
| 0.68 | 0.0017 | 10 |

Flow restriction 24 is configured to develop a pressure differential that is neither too high for the pressure source nor too low for pressure sensor 24. For example, if a solenoid pump is used to supply methanol 17, some models of solenoid pumps may have a maximum pumping pressure of about 4 psig. Hence the pressure drop caused by the flow restriction should be less than 4 psig at full flow rate, so that the pump has enough pressure to overcome a) the pressure drop of the fuel cell fluidic path and b) the differential pressure caused by flow restriction 24. If the differential pressure is too low, say less than 0.1 psig for some sensors for example, then the resultant differential pressure reading produced by the pressure sensor may be too low for the control circuit to accurately and repeatedly record. Pressure drops less than 0.1 psig can be used, depending on the sensor employed.

Flow meter 22 may also affect total power consumption in the fuel cell system. If sensor 28 is applied to an air stream produced by an air compressor, then the resulting differential pressure caused by the flow restriction could increase the power required to drive the compressor at a specified airflow rate. To avoid such parasitic performance and improve net power for the fuel cell system, flow restriction 24 may be designed and configured as an integral part of the system to avoid parasitic pressure losses. For example, the cathode flow path has a relatively constant flow resistance, about 0.5 psig for example, and sensor 28 may be configured to measure the differential pressure across the cathode inlet and exit; as a result, no additional flow restriction is added by sensor 28 that increases parasitic power consumption.

Pressure may also be used to convey flow rates and performance suitable for use herein. In one embodiment, for liquid fuels fed by a pump, differential pressure at maximum rated flow is about 0.5 psig to about 5 psig. For liquid fuels fed by a pressurized fuel cartridge, a differential pressure may be as high as about 10 psig to about 20 psig at maximum rated flow. For hydrogen fuel, a differential pressure at maximum rated flow between about 2 psig and about 5 psig is suitable for use. For reactant air streams, a differential pressure at maximum rated flow about 0.5 psig is suitable if the air stream is supplied by a compressor, and about 0.05 inches-water pressure if the air stream is supplied by a fan or blower. The desired pressure drops listed above may vary depending on the type of pressure source, available sensor technology, etc. Sizing of the pressure drop caused by the pressure restriction is dependant on many aspects of a complete fuel cell system, pressurized or non-pressurized liquid fuels, pressure rating of the pump or compressor, pressure rating of available pressure sensing technologies etc. Other differential pressures may be used for each of the reactants in a fuel cell system.

In another embodiment, differential flow meter 22 includes a tube that is adapted to improve detection and sensing of a parameter used in fluid flow rate assessment. In a specific embodiment, the tube is lengthened to decrease flow rate sensitivity to upstream and downstream disturbances and to provide a more stable flow and flow rate along the length of the tube. The tube may be coiled to increase its length while minimizing space in a small volume fuel cell package. In a specific embodiment, the tube is greater than about 2 centimeters in length. Tube lengths greater than about 4 centimeters in length are also suitable for use.

At least one sensor 28 measures differential pressure of across locations of differential flow meter 22, and outputs a signal including information indicative of the sensed pressure(s) to controller 200. Fluid delivery system 11a of FIG. 2A includes one sensor; system 11b of FIG. 2B includes two sensors. For FIG. 2B, the two sensors 28 detect fluid pressure at two locations of the flow restriction 24, each provide a signal to controller 200, which then compares the measured values to determine a pressure difference. Sensing may be done directly in the fluid or indirectly, e.g., on an outside surface of the tube. The two locations may include any two portions of flow restriction 24 or differential flow meter 22, such as relatively opposite ends of a tube. Alternatively, the two locations may include inlet and outlet ends of a narrowing orifice. In one embodiment, the fuel cell system package includes a circuit board that supports controller 200, and sensor 28 attaches to the circuit board. This decreases size of the fuel cell package and permits simple mounting and assembly of components of fluid delivery system 11a. In a specific embodiment, sensor 28 is a model 24 PC as provided by Honeywell Corp. of Freeport, Ill.

Controller 200 receives a signal from sensor 28 and is configured to convert information in the signal to a command that affects flow rate of methanol 17. Controller 200 is described in further detail below with respect to FIG. 2C.

Figure 2B:
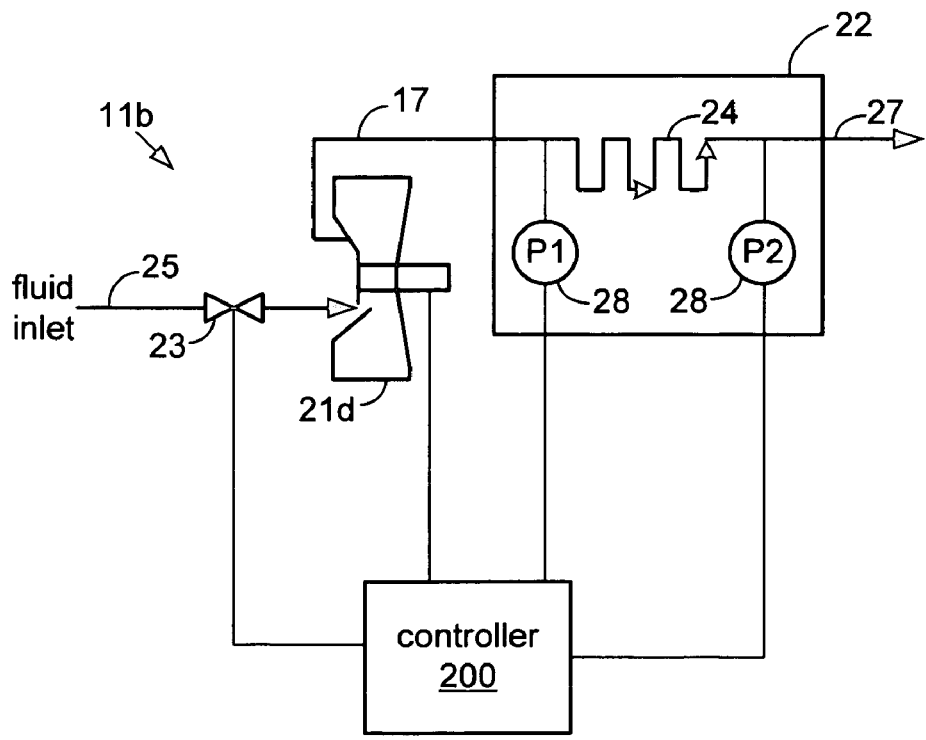

FIG. 2B shows a fluid delivery system 11b in accordance with another embodiment of the present invention. Fluid delivery system 11b includes an inlet valve 23, inlet line 25, diaphragm pump 21d, a differential flow meter 22 that includes flow a coiled flow restriction 24d and two sensors 28, controller 200, and outlet line 27.

Diaphragm pump 21d moves liquid methanol 17. A diaphragm pump (also referred to as a 'membrane pump') is a small pump that includes a chamber bordered by a diaphragm whose displacement is controllable. Applying a control signal to the diaphragm pump 21d excites an actuator that causes the diaphragm to translate back and forth, perpendicular to a diaphragm face. This displaces volume in the chamber and moves the fluid. Two check valves, oriented to permit flow in opposite directions relative to the chamber, allow fuel to enter and exit the chamber. Actuating the diaphragm hence moves the methanol 17 from the intake to exhaust check valve in response to a control signal by controller 200.

Diaphragm pumps 21d are inexpensive and compact pumps, available from a wide variety of vendors, and offer reduced power consumption. Piezoelectric actuation in a diaphragm pump is well suited for pump 21. The exact pump used will depend on whether the pump moves a liquid or a gas, a desired flow rate, and size demands. One suitable diaphragm pump for moving a liquid in a fuel cell system is a model LPD-100 available from PAR Technologies of Hampton, Va. A suitable diaphragm pump for moving a gas (e.g., air or hydrogen) in a fuel cell system is a model RTP32A03 available from Okenseiko of Japan. The specifications for these pumps are available from their respective manufactures and are incorporated herein by reference in their entirety and for all purposes; other diaphragm pumps are suitable for use herein. Many of these commercially available pumps are configured to consume less than about 2 watts when moving a fluid, which is of value to portable fuel cell systems since power consumed by the pump affects net power efficiency of the portable system.

Despite size and power advantages of diaphragm pumps 21d, these pumps have not been used in micro-fuel cell systems due to their inherent lack of controllability. Diaphragm pump actuators permit control of: displacement of the diaphragm and/or amplitude of the diaphragm displacement. Since a diaphragm pump 21d has a large diameter relative to the tubes that feed it and that it pumps into, small fluctuations in the downstream flow resistance lead to large changes in flow rate. In an ideal system, the downstream flow resistance is constant, and hence it would be possible to accurately gauge pumped flow rate if the pump frequency and or amplitude are known.

Realistically however, downstream flow resistance of micro fuel cell systems constantly changes. Many factors such as manufacturing tolerances, temperature variations, and/or vaporizer pressure oscillations (e.g., resulting from a boiler blow-down) cause the downstream flow resistance to vary and become unstable. When the flow resistance becomes unstable, it is typically not possible to calculate fluid flow rate based solely on the actuation frequency/amplitude of a diaphragm pump.

Figure 4A:
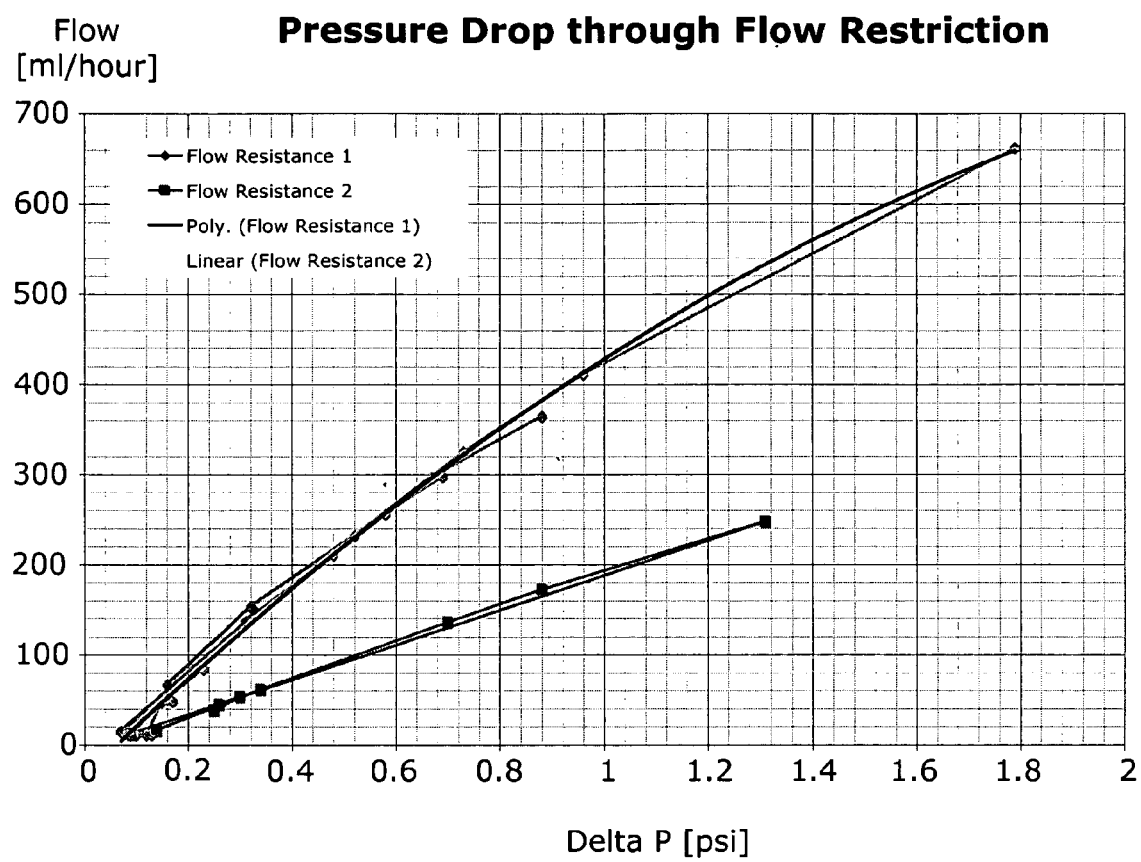
FIG. 4A shows data that illustrates the controllability imparted by a fluid delivery system of the present invention.
Figure 4B:
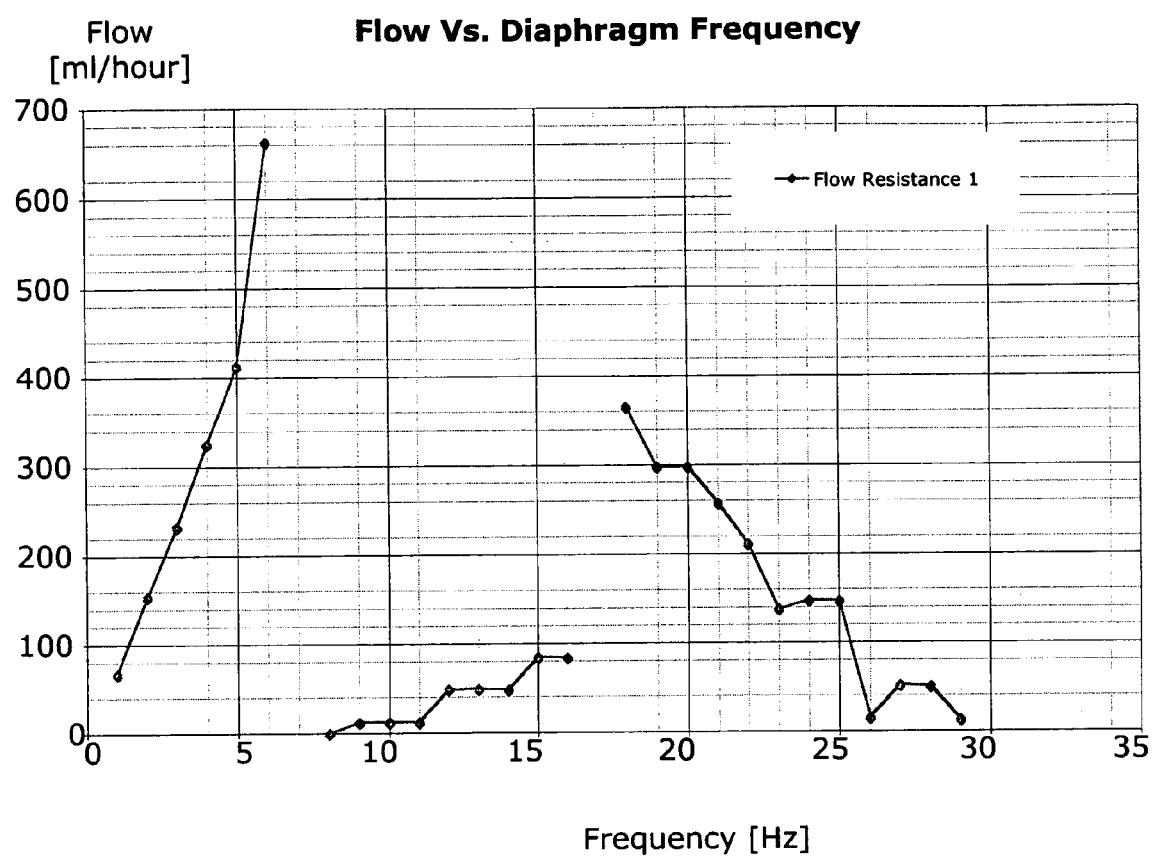
FIG. 4B shows flow data in a flow vs. frequency of a conventional diaphragm pump.

In order to overcome these control problems with a diaphragm pump or another low flow rate pump, the fluid delivery system 11b adds a differential flow meter 22 to provide accurate flow rate assessment and control of fluids moved by diaphragm pump 21d, regardless of the downstream components and pressure disturbances. In this case, differential flow meter 22 includes two sensors 28 located at opposite ends of a coiled tube flow restriction 24. FIGS. 4A and 4B, as described below, illustrate the difference in control by adding differential flow meter 22. In one embodiment, the fluid delivery system 11b components are integrated into a single unit. In another embodiment, the fluid delivery system 11b components are discrete devices.

An additional issue associated with commercially available diaphragm pumps is that they generally do not provide shutoff capability when not in use, and cannot be used to throttle fluid flow from high to low pressure. Therefore, if a methanol storage device acquires a higher pressure than the downstream system (e.g., the storage device is left on a dashboard of a car for some time and heats up), then pump 21 may leak fuel into the downstream catalytic systems. This leakage can permanently damage the fuel cell system, or lead to unwanted release of fluids into the environment outside the fuel cell system.

To overcome such upstream pressure and leakage issues, fluid delivery system 11 includes an inlet valve 23 that provides shutoff capability. The shutoff valve permits fluidic disconnect between an upstream line-that communicates with the storage device and a line that communicates the methanol to a fuel processor or another downstream component. The fluidic disconnect prevents fuel from leaking through pump 21 when pressure in the fuel supply or fuel storage device rises above the downstream system pressure. This may occur when the fuel cell system is off and stored in a hot location, for example. In a specific embodiment, shutoff valve 23 is included in a quick disconnect fitting, at the interface of the storage device and a package housing that contains the fuel cell system; the quick disconnect allows for rapid replacement of the storage device. Shutoff valve 23 thus solves the problem of unexpected high pressure in an upstream source sending fluids to an unprepared fuel processor and fuel cell system.

Controller 200 sends control signals to valve 23 and permits automated on/off control of methanol 17 into system 11a. Thus, controller 200 may disconnect shutoff valve 23 when a fuel cell system is turned off, not producing hydrogen in the fuel processor, and/or not generating electricity.

Figure 2C:
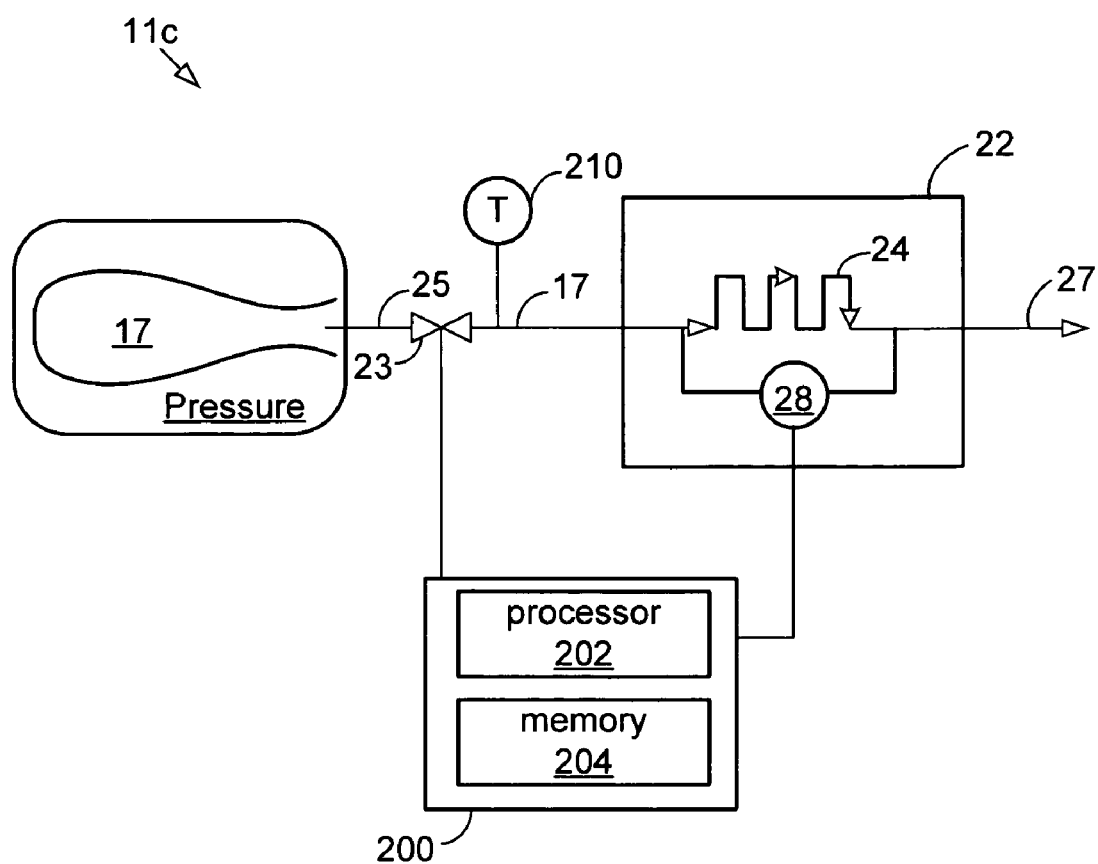

Although the present invention has been described so far with respect to a pump used as a pressure source to move fluid, other pressure sources may be employed in fluid delivery system 11. This may include any mechanism that moves a fluid, including those that do not provide active control, such as a single speed compressor or single speed pump. FIG. 2C shows a fluid delivery system 11c that uses a pressurized storage device 16 in accordance with another embodiment of the present invention. Fluid delivery system 11c includes storage device 16, inlet line 25, flow control valve 23c, a differential flow meter 22, controller 200, and outlet line 27.

Pressurized storage device 16 is configured to provide a relatively steady pressure that does not allow for feedback-based control. Storage device 16 may include a foam or propellant that expands and pushes on a collapsible bladder (e.g., rubber) in the storage device, which maintains an elevated pressure in the bladder so as to move fluid from the bladder into line 25. Other mechanisms may be used in storage device 16 to move the fuel source therefrom, such as another process fluid that applies a steady pressure to the bladder.

For a less controllable pressure source such as this, the present invention uses valve 23 to regulate flow rate of the methanol 17. In this case, fluid delivery system 11c employs feedback from a flow sensor 28 to alter opening (e.g., magnitude, rate, etc.) of the valve to produce a desired flow rate for the fluid. Valve 23 may include a proportional type valve with variable opening characteristics, or it may be a nominally open or closed valve. A valve with shutoff capability may also be used. Valve 23 may also permit flow rate control in real time.

Controller 200 is configured to convert a signal output by the at least one sensor 28 to a command that affects flow rate of the fuel source. The controlled device may vary with the fuel cell system, as one of skill in the art will appreciate. For the schematic shown in FIG. 1C, controller 200 may output commands to: pumps 21a and 21b, valve 23, air compressor 41 for inlet to the cathode, a blower 37 for cooling the fuel cell 20, and a blower that passes air over one or more heat transfer appendages in the fuel cell for cooling of the fuel cell stack, if used. If package 10 is electrical load following, then controller 200 meters fuel source 17 to deliver fuel source 17 at a flow rate determined by a desired power level output of fuel cell 20. For fuel provision to the heater, fluid delivery system 11 may deliver fuel source 17 to the heater to maintain a certain temperature in the heater or inlet fuel source. In one embodiment, a separate controller 200 is used for fluid delivery system 11. In another embodiment, control of fluid delivery system 11 is integrated into a main fuel cell control system.

As shown in FIG. 2C, controller 200 includes a processor 202 and a memory 204. Processor 202 may include a commercially available microprocessor such as one of the Intel or Motorola family of chips, a reduced instruction set computer (RISC) chip such as the PowerPC™ microprocessor available from Motorola, Inc, or any other suitable processor. Memory 204 may comprise some form of digital storage such as a mass storage or RAM available to processor 202 and configured to store control programs and data. Regardless of controller 200 configuration, it may employ one or more memories or memory modules configured to store program instructions for controlling fuel cell and fluid delivery system 11 systems described herein. Such memory or memories may also be configured to store data structures, control programs, or other specific non-program information described herein.

Many of the methods and techniques described herein constitute system controls and will comprise digital control applied by control logic that implements instructions from stored software. The stored instructions may correspond to any methods or elements described herein. The control logic includes any combination of hardware and software needed for control. For example, the control logic may include instructions stored in memory 204 that are executed by processor 202. Input/output logic may be employed to facilitate communication between processor 202 and components of fluid delivery system 11.

A differential pressure measures the pressure drop across the flow restrictor, and this pressure drop can be used to determine flow rate across the restrictor. A linear or polynomial equation, for example, may be used to assess flow rate based on a measured differential pressure across the restrictor. The equation may be stored in memory 204 as computer instructions or a program run by processor 202 that converts pressure-related signals received from sensor 28 to flow rate control commands on pump 21 or valve 23.

Fuel delivery system 11 may also accommodate for temperature. As shown in FIG. 2C, fuel delivery system 11c includes a temperature sensor 210 that measures temperature of methanol 17 flowing in line 21, or at another location within the micro fuel cell system, such as the methanol flowing through a pump 21. Temperature sensor 210 may also detect the ambient temperature. Using a reading of the fuel temperature, a calibration curve for fluid control can be adjusted to account for material property changes of the fluid (such as viscosity) that are affected by temperature.

Figure 3:
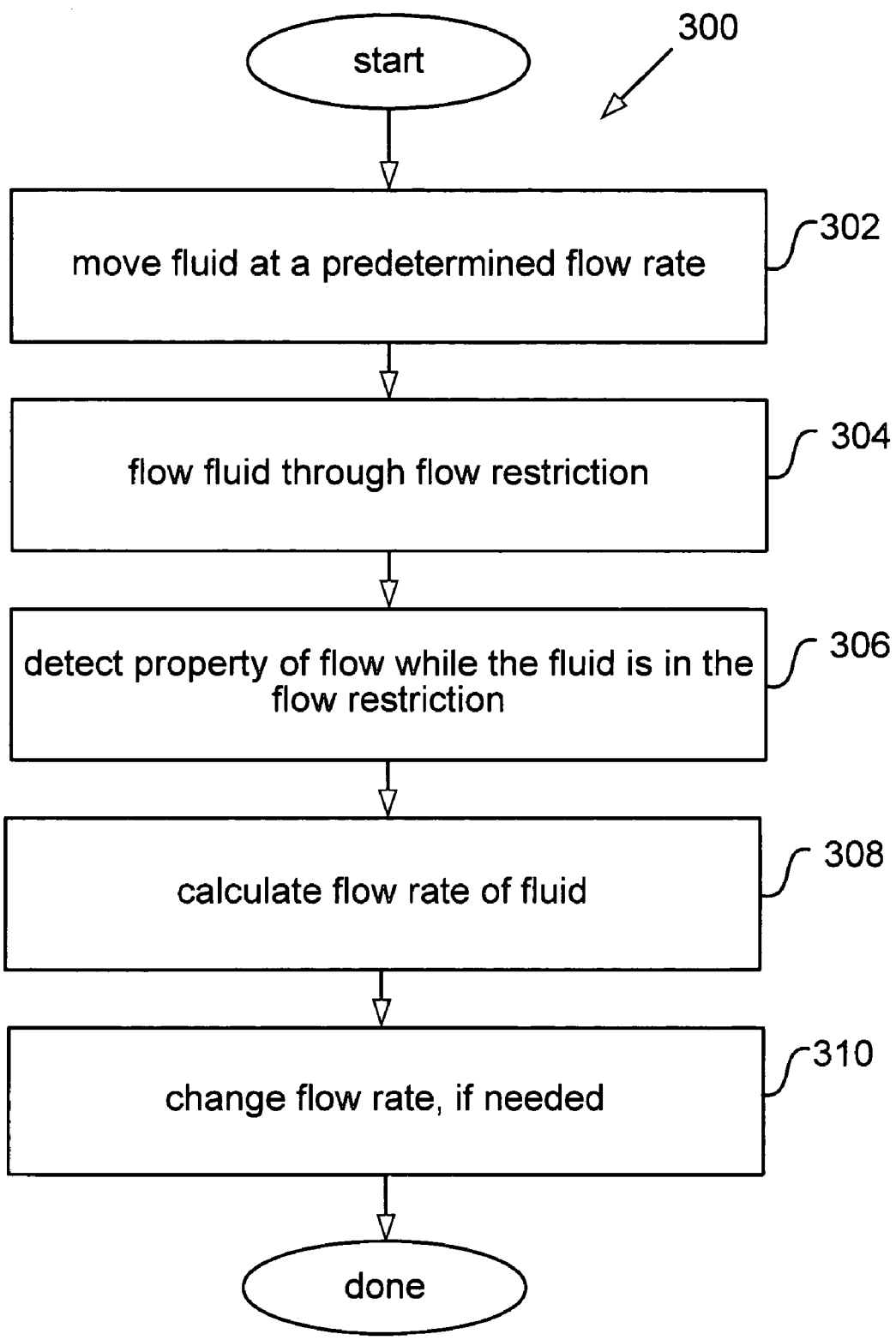
FIG. 3 shows a process flow for controlling fluid delivery in a fuel cell system in accordance with one embodiment of the present invention.

FIG. 3 shows a method 300 for controlling fluid delivery in a fuel cell system in accordance with one embodiment of the present invention. As mentioned above, the fluid may include any reactant for the fuel cell system such as hydrogen, oxygen or a fuel source converted to hydrogen by a fuel processor.

Process flow 300 may start when a system controller receives a call for electrical energy production in a fuel cell, or a call for fuel source flow. To begin, the controller may open a disconnect or shutoff valve, if one is included in the fuel cell system to prevent flow.

The controller then sends a command to begin movement of the fluid at a predetermined flow rate (302). Actuation of a diaphragm pump may commence at a preset frequency or amplitude. In this case, the fluid travels to the pump, which pressurizes the fluid and pumps it to one or more downstream components. Alternatively, a controller may send a signal to a proportional valve, appropriate for the desired flow rate, if the valve is used to regulate fluid flow from a steady pressure source.

The fluid then flows through the flow restriction (304) and a property of the fluid flow is detected while the fluid is in the flow restriction (306). In one embodiment, differential pressure is measured in multiple portions of the flow restriction.

The measured differential pressure is then used to determine flow rate of the fluid (308). A pre-determined formula stored in software permits automated conversion and control in real time. This assumes some form of calibrated relationship between pressure (delta p) and flow in the flow restriction (see FIG. 4A for example). Flow rate estimation may also accommodate for temperature. In this case, a sensor detects temperature of the fluid or ambient temperature, and the controller uses the measured temperature to adjust a calibration curve, when appropriate (e.g., to the nearest temperature curve for the fluid).

Process flow 300 then changes flow rate of the fluid, if needed (310). For example, if the flow is incorrect by more than +/−5%, diaphragm frequency and/or amplitude of a diaphragm pump may be changed. Steps 304–310 may repeat until the flow is within 5% of a desired flow rate. Different error bounds and correction schemes may be used, such as 1–2%, or less. In this manner, the controller and fluid delivery system provide an adaptive system that achieves a desired flow rate based on measured performance. As described above, the desired flow rate will vary with the fuel cell system and fluid being moved. In one specific fuel cell system, a 45 W reformed methanol micro fuel cell system pumps about 45–60 millilieters per hour of methanol; the same system may also move 2–8 liters per minute of air.

If the system controller receives call to halt fuel flow, then actuation of the diaphragm ceases and/or the shutoff valve is closed.

Data plotted in a chart shown in FIG. 4A illustrates the controllability imparted by fluid delivery system 11b and process flow 300. The tests used to derive the data were performed using a diaphragm pump 21, a variable metering valve to serve as flow restrictor 24, and two pressure sensors 28 that provided differential pressure reading across the flow restrictor 24. Data in the chart shows that the flow rate passing through flow restrictor 24 can be accurately measured, independent of the actual pumping mechanism.

By contrast, FIG. 4B shows flow data in a flow vs. actuation frequency of a diaphragm pump 21 for "restriction 1" of FIG. 4A. As can be seen, the data in FIG. 4B does not offer a reliable method for relating fluid flow to diaphragm pump actuation frequency (which is analogous to revolutions per minute in a centrifugal pump). Comparing the charts in FIGS. 4A and 4B, it becomes clear that the present invention permits reliable controllability for micro fuel cells and other applications.

Fuel Cell System Package

The present invention is well suited for use in a reduced-size and portable fuel cell package. A fuel package refers to a fuel cell system that receives hydrogen, or a hydrogen fuel source, and outputs electrical energy. At a minimum, this includes a fuel cell. The package need not include a cover or housing, e.g., in the case where a fuel cell, or a fuel cell and fuel processor, is included in a battery bay of a laptop computer. In this case, the fuel cell package only includes the fuel cell, or fuel cell and fuel processor, and no housing. The package may include a compact profile, low volume, or low mass—any of which is useful in any power application where size is relevant. As the term is used herein, fuel cell package and fuel cell system are synonymous, where package is used to more conveniently express volume and power density.

In one embodiment, the fuel cell package includes a fuel cell, a fuel processor, and dedicated connectivity between the two. The dedicated connectivity may provide a) fluid or gas communication between the fuel processor and the fuel cell, and/or b) structural support between the two or for the package. In one embodiment, a dedicated interconnect provides much of the connectivity. Assembling the fuel processor and fuel cell together in a common and substantially enclosed package provides a portable 'black box' package that receives a hydrogen fuel source and outputs electrical energy.

Figure 5A:
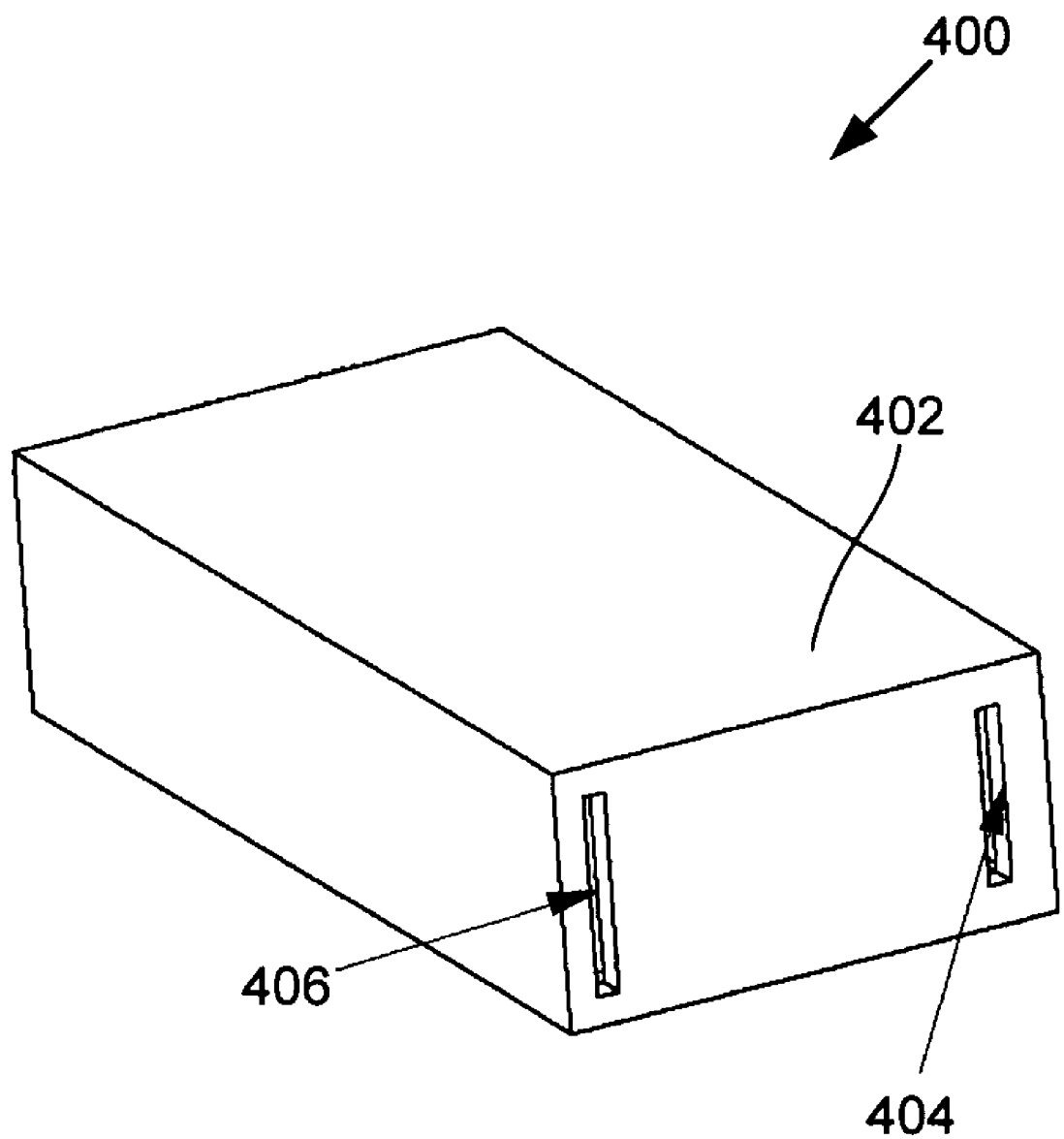
FIG. 5A illustrates an outer perspective view of a fuel cell package in accordance with one embodiment of the present invention.

FIG. 5A illustrates a fuel cell package 400 in accordance with one embodiment of the present invention. Package 400 provides compact and portable electrical energy generation using fuel cell technology.

An outer housing 402 contains a fuel cell. Housing 402 provides mechanical protection for internal components within its boundaries, and may include any shape or configuration to provide such protection. Housing 402 includes a number of openings for air intake and exhaust. Opening 404 allows air from the ambient room or environment to enter package 400, e.g., to cool a fuel cell contained therein or for energy generation in the fuel cell. Opening 406 acts as an exhaust port for heated gases after they acquire heat from the fuel cell, which typically operates at an elevated temperature relative to air in the ambient environment. While openings 404 and 406 are shown as somewhat linear slits, the openings may comprise any dimensions suitable for intake and exhaust of cooling air (or oxygen used in a fuel processor). In addition, the package may include less or greater than two openings.

Volume may characterize package 400. The volume includes all components of the package used in the system to generate electricity, save a storage device used to supply hydrogen or a fuel source. In one embodiment, the volume includes the fuel cell and any components external to housing 402 used to generate electricity (e.g., not just components included within housing 402, such as a pump used for fuel delivery disposed partially outside the housing), and/or a power conditioner that converts the fuel cell output voltage to a level required by a power consumer and which may be turned on or off by the fuel cell control system as needed. In one embodiment, package 400 has a total volume less than about a liter. In a specific embodiment, package 400 has a total volume less than about ½ liter. Greater and lesser package volumes may be used with the present invention.

Package 400 also includes a relatively small mass. In one embodiment, package 400 has a total mass less than about a 1 kg. In a specific embodiment, package 400 has a total volume less than about ½ liter. Greater and lesser package masses are possible.

Figure 5B:
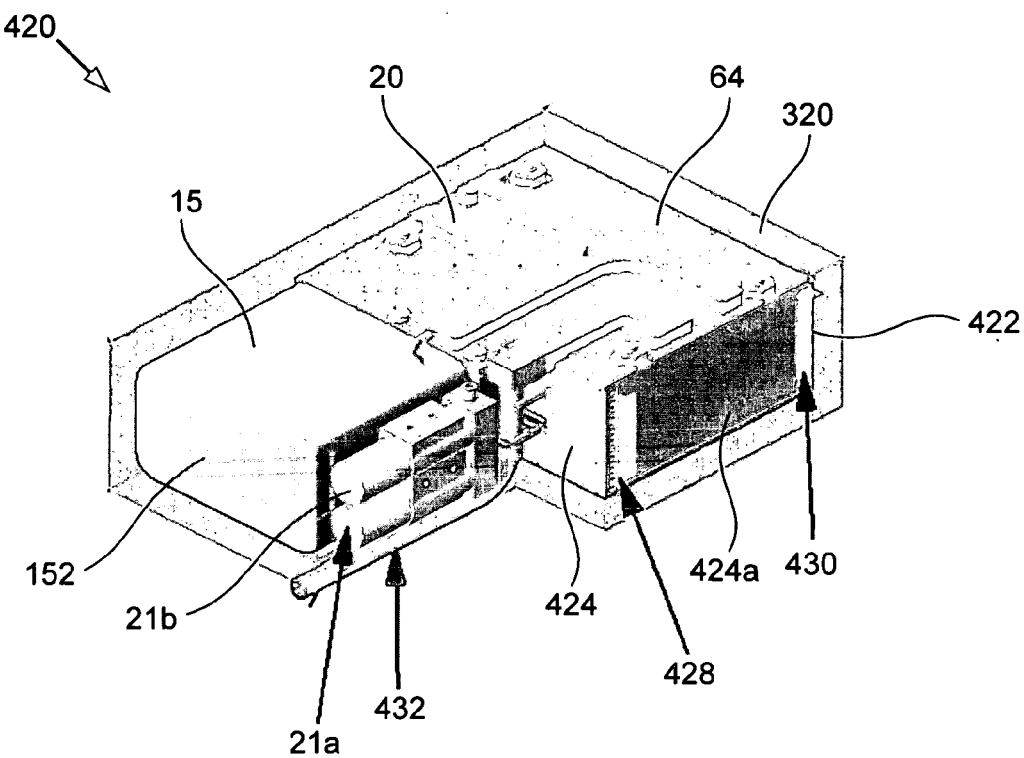
FIG. 5B shows a perspective view of internal components of a coplanar fuel cell package in accordance with a specific embodiment of the present invention.

FIG. 5B shows a perspective view of a coplanar fuel cell system in a single package 420 in accordance with one embodiment of the present invention. Package 420 includes fuel cell 20 and fuel processor 15, arranged adjacent to each other.

Fuel cell 20 is shown with a housing 422 that includes top plate 64 and a number of sidewalls 424. Sidewall 424a includes two openings: a cooling air intake 428 and an exhaust 430. Cooling fan 37 of FIG. 1C is disposed relatively close and internal to intake 428 or exhaust 430.

For package 420, fuel pumps 21 are included for fluid delivery and attached to an external housing of the package. Fuel pumps 21 may employ a solenoid pump, syringe pump or any other commercially available pump that moves a fuel. FIG. 5B also shows an air intake pipe 432 (line 31 of FIG. 1C) that communicates oxygen and air from the ambient room or environment, through the package housing, and to fuel cell 20 for use in the cathode.

Figure 5C:
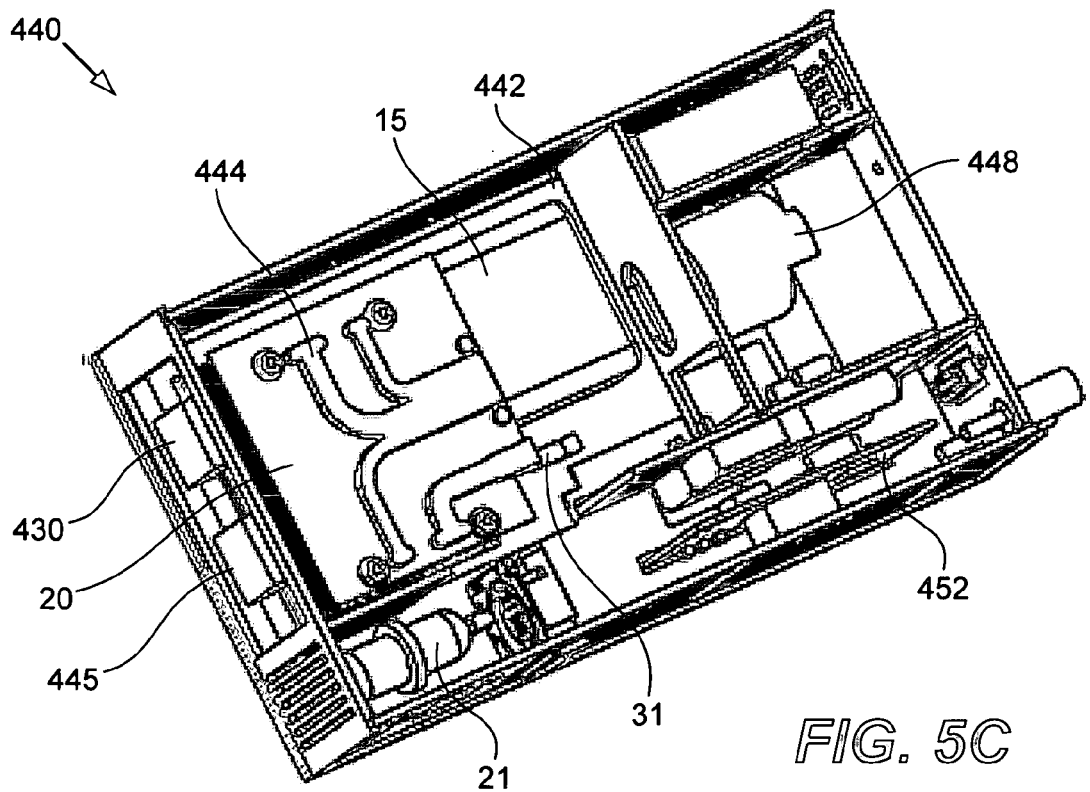
FIG. 5C illustrates a perspective view of internal components for a fuel cell package in accordance with another specific embodiment of the present invention.

FIG. 5C illustrates a perspective view of internal components for a fuel cell package 440 in accordance with another embodiment of the present invention.

Package 440 includes a block chassis 442 that acts as a structural framework to which functional components of package 440 are attached. In one embodiment, chassis 442 forms a bottom wall of an external housing for package 440. Chassis 442 includes a suitably stiff material, such as a metal or rigid plastic. Aluminum, $Fr_4$, carbon fiber, ABS and steel are all suitable for use. Alternatively, any material that provides mechanical integrity and includes a low thermal conductance may be used.

Package 440 also includes fluid lines and connections 444 incorporated into fuel cell 20 and fuel processor 15, as opposed to separate tubes and hoses between the fuel cell 20 and processor 15. This decreases size for package 440. Pump 21 provides fuel source movement and is coupled to a bracket that attaches to chassis 442. An air compressor 448 provides air to the fuel cell cathode and is attached to chassis 442. An intake plenum 445 is included to guide air between an outer housing of package 440 and inlet port 428 of fuel cell 20.

Control board 452 includes suitable software and hardware for controlling components within package 440. Hardware may include a commercially available processor, such as any of those available in the Intel, MicroChip or Motorola family of processors. Some form of memory is also included. Random-access memory (RAM) and read-only memory (ROM) may be included to store fuel delivery program instructions, implemented by the processor, that execute control functions for one more components of a fuel cell system. The control board may also include a device to allow for reprogramming of the control system firmware without the need to remove the control board.

The control system may also include one or more batteries, capacitors or other energy storage devices wired in a serial and/or parallel, and wired in parallel with the fuel cell which serve to allow for hybridized power output. The control circuit may include other devices to allow the energy storage devices to share the net load on the system with the fuel cells, or to take up the whole load of the system if the fuel cell is not producing power, or to be completed removed from the load output. Additional circuitry may be provided for the fuel cells to recharge the energy storage devices in the case that they are rechargeable batteries or capacitors, or any other energy storage device that can be electrically recharged.

An electrical adapter may also be included in the package (not shown in FIG. 5C, and can also be part of control board 452) converts electrical energy output by fuel cell 20 to a suitable level as determined by design of package 440. For example, package 440 may be used as a tethered adapter to power a laptop computer, in which electrical adapter 446 converts electrical energy output by fuel cell 20 to a voltage and current suitable for electrical provision to the laptop. DC/DC conversion is typical, but other power conditioning may also be applied. The electrical adaptor, or power regulator, may also have the capability to be turned on or off as needed, and may include load leveling capabilities such as provided by capacitors on the input and output lines. Adapter 446 may also include a hardware interface that receives a wire that couples to the electronics device.

Package 440 may also includes additional fuel cell system components such as a cathode air inlet 31, a fuel feed from a detachable fuel source cartridge that couples to package 440, and a sensor and wires for temperature sensing.

Although fuel cell packages have been largely described with respect to fuel processor inclusion, a package of the present invention need not include a processor. In another embodiment, the package only includes a fuel cell that receives hydrogen from a supply coupled to the package. The package then provides a portable black box that receives hydrogen and outputs electrical energy. Since the volume has decreased, this provides fuel cell packages with less volume and mass—for the same power output—and thus even greater power densities.

In one embodiment, the present invention provides a tethered fuel cell package. A tethered package refers to a fuel cell package including a tether that allows electrical coupling to the package from a distance, and typically includes a conductor capable of communicating electrical energy from a fuel cell or electrical adapter included in the package to an electronics device. In one embodiment, the tether includes a wire detachably coupled to the package and configured to transmit DC electricity generated by the fuel cell. Since the fuel cell package is portable, tethering the package provides a portable form of electrical power that may be plugged into one or multiple portable electronics devices.

Fuel Cell

Figure 6A:
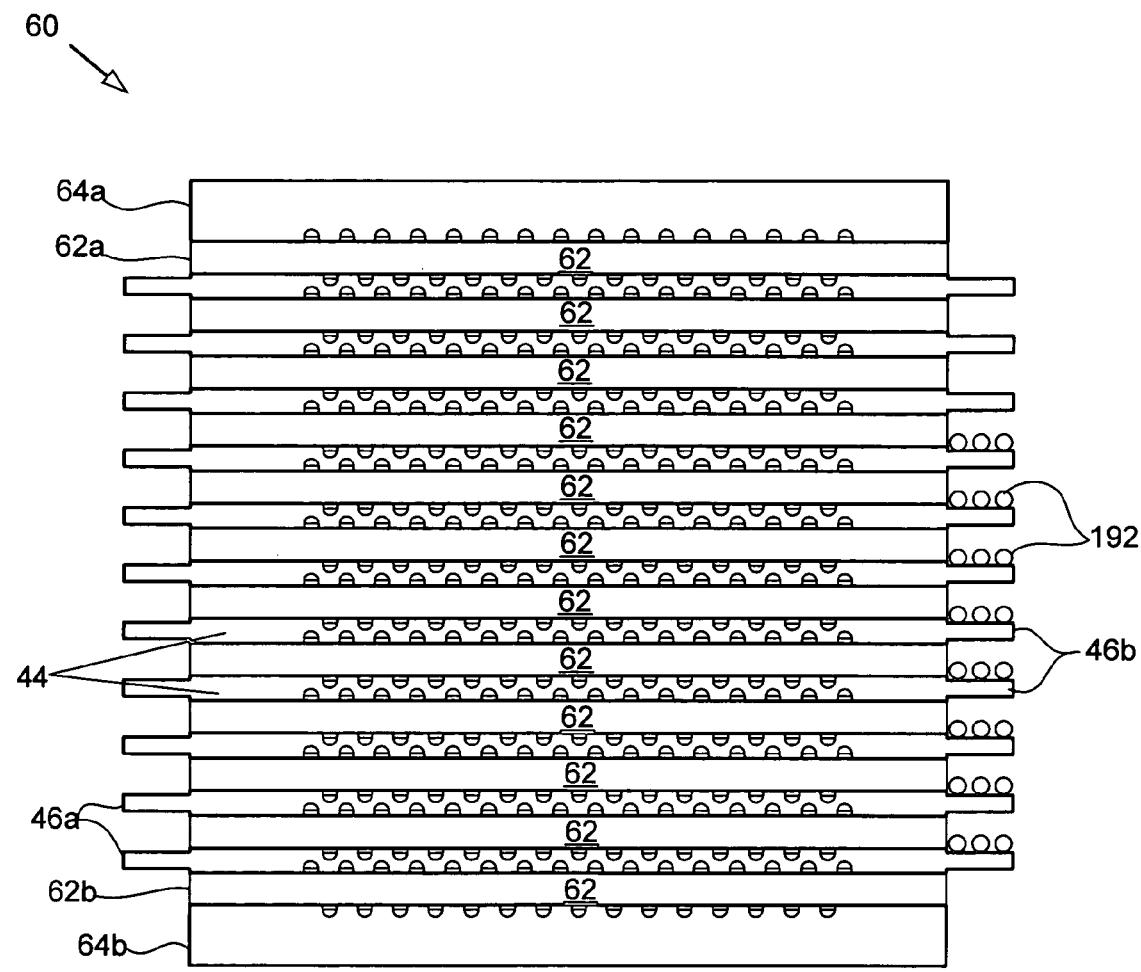
FIG. 6A illustrates a simplified cross sectional view of a fuel cell stack for use in the fuel cell of FIG. 1A in accordance with one embodiment of the present invention.
Figure 6B:
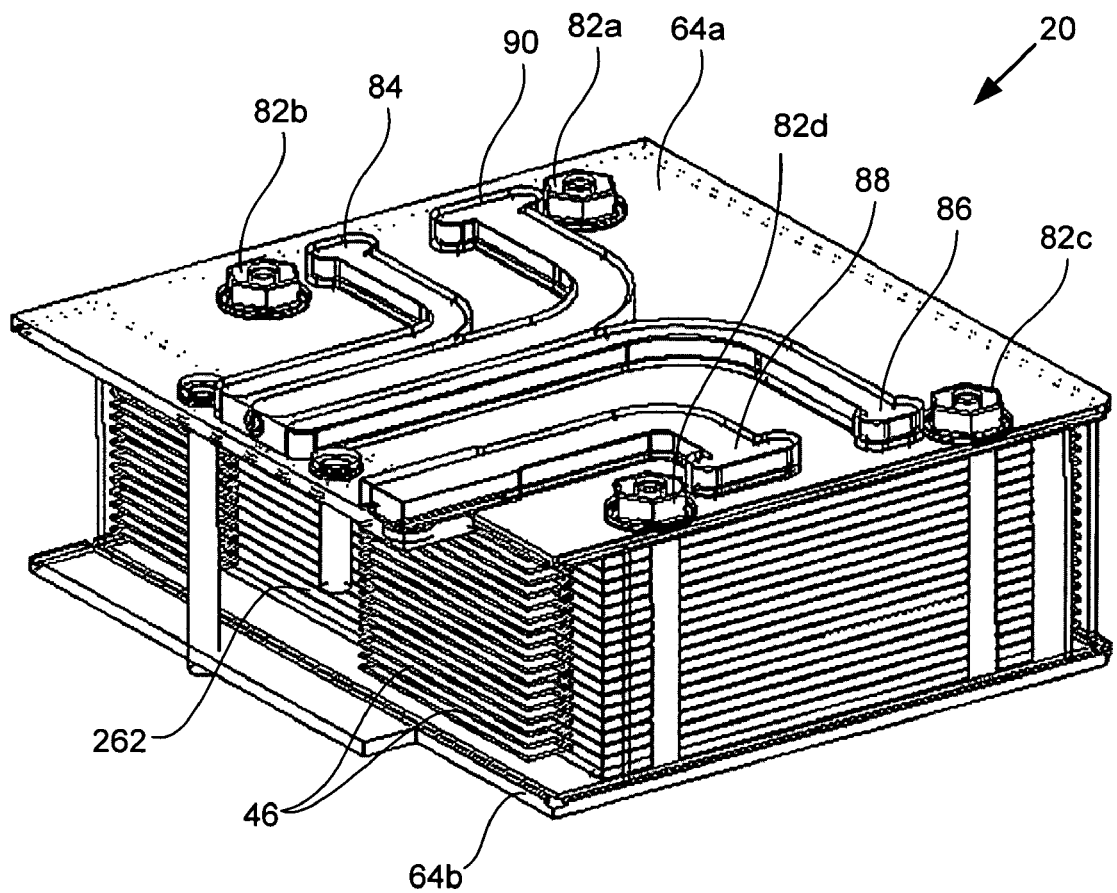
FIG. 6B illustrates an outer top perspective view of a fuel cell stack and fuel cell in accordance with another embodiment of the present invention.

FIG. 6A illustrates a cross sectional view of a fuel cell stack 60 for use in fuel cell 20 in accordance with one embodiment of the present invention. FIG. 6B illustrates an outer top perspective view of a fuel cell stack 60 and fuel cell 20 in accordance with another embodiment of the present invention.

Referring initially to FIG. 6A, fuel cell stack 60 includes a set of bi-polar plates 44 and a set of membrane electrode assembly (MEA) layers 62. Two MEA layers 62 neighbor each bi-polar plate 44. With the exception of topmost and bottommost membrane electrode assembly layers 62a and 62b, each MEA 62 is disposed between two adjacent bi-polar plates 44. For MEAs 62a and 62b, top and bottom end plates 64a and 64b include a channel field 72 on the face neighboring an MEA 62.

The bi-polar plates 44 in stack 60 also each include one or more heat transfer appendages 46. As shown, each bi-polar plate 44 includes a heat transfer appendage 46a on one side of the plate and a heat transfer appendage 46b on the opposite side. Heat transfer appendages 46 are discussed in further detail below.

As shown in FIG. 6A, stack 60 includes twelve membrane electrode assembly layers 62, eleven bi-polar plates 44 and two end plates 64 (FIG. 6B shows 18 plates 44 in the stack). The number of bi-polar plates 44 and MEA layers 62 in each set may vary with design of fuel cell stack 60. Stacking parallel layers in fuel cell stack 60 permits efficient use of space and increased power density for fuel cell 20 and a fuel cell package 10 including fuel cell 20. In one embodiment, each membrane electrode assembly 62 produces 0.7 V and the number of MEA layers 62 is selected to achieve a desired voltage. Alternatively, the number of MEA layers 62 and bi-polar plates 44 may be determined by the allowable thickness of package 10. A fuel cell stack 60 having from one MEA 62 to several hundred MEAs 62 is suitable for many applications. A stack 60 having from about three MEAs 62 to about twenty MEAs 62 is also suitable for numerous applications. Fuel cell 20 size and layout may also be tailored and configured to output a given power.

Referring to FIG. 6B, top and bottom end plates 64a and 64b provide mechanical protection for stack 60. End plates 64 also hold the bi-polar plates 44 and MEA layers 62 together, and apply pressure across the planar area of each bi-polar plate 44 and each MEA 62. End plates 64 may include steel or another suitably stiff material. Bolts 82a–d connect and secure top and bottom end plates 64a and 64b together.

Fuel cell 20 includes two anode manifolds (84 and 86). Each manifold delivers a product or reactant gas to or from the fuel cell stack 60. More specifically, each manifold delivers a gas between a vertical manifold created by stacking bi-polar plates 44 (FIG. 6D) and plumbing external to fuel cell 20. Inlet hydrogen manifold 84 is disposed on top end plate 64a, couples with an inlet line to receive hydrogen gas, and opens to an inlet hydrogen manifold 102 (FIG. 6D) that is configured to deliver inlet hydrogen gas to a channel field 72 on each bi-polar plate 44 in stack 60. Outlet manifold 86 receives outlet gases from an anode exhaust manifold 104 (FIG. 6D) that is configured to collect waste products from the anode channel fields 72 of each bi-polar plate 44. Outlet manifold 86 may provide the exhaust gases to the ambient space about the fuel cell. In another embodiment, manifold 86 provides the anode exhaust to line 38, which transports the unused hydrogen back to the fuel processor during start-up.

Fuel cell 20 includes two cathode manifolds: an inlet cathode manifold or inlet oxygen manifold 88, and an outlet cathode manifold or outlet water/vapor manifold 90. Inlet oxygen manifold 88 is disposed on top end plate 64a, couples with an inlet line (line 31, which draws air from the ambient room) to receive ambient air, and opens to an oxygen manifold 106 (FIG. 6D) that is configured to deliver inlet oxygen and ambient air to a channel field 72 on each bi-polar plate 44 in stack 60. Outlet water/vapor manifold 90 receives outlet gases from a cathode exhaust manifold 108 (FIG. 6D) that is configured to collect water (typically as a vapor) from the cathode channel fields 72 on each bi-polar plate 44.

As shown in FIG. 6B, manifolds 84, 86, 88 and 90 include molded channels that each travel along a top surface of end plate 64a from their interface from outside the fuel cell to a manifold in the stack. Each manifold or channel acts as a gaseous communication line for fuel cell 20 and may comprise a molded channel in plate 64 or a housing of fuel cell 20. Other arrangements to communicate gases to and from stack 60 are contemplated, such as those that do not share common manifolding in a single plate or structure.

Figure 6C:
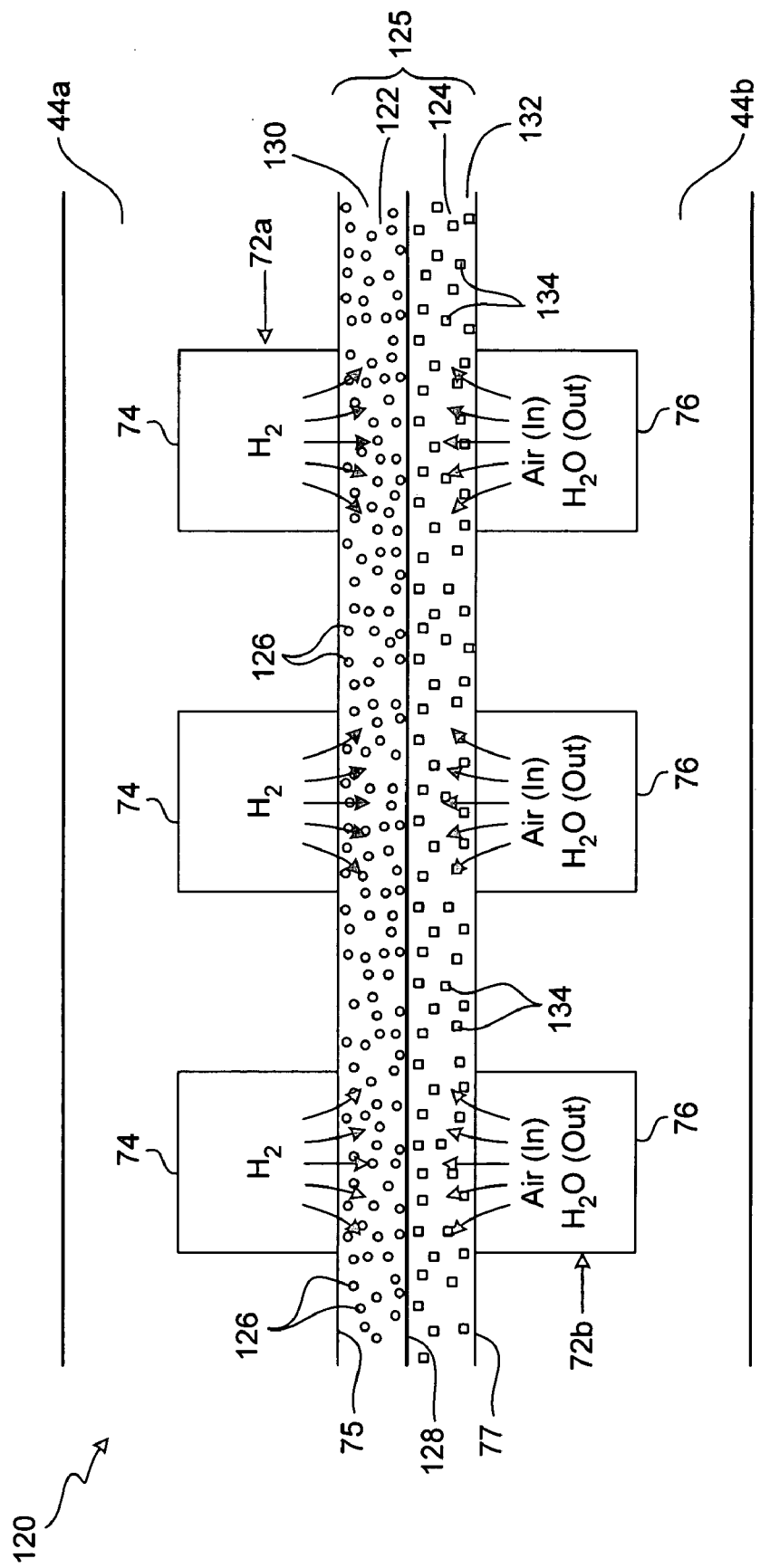
FIG. 6C illustrates an ion conductive membrane fuel cell (PEMFC) architecture for the fuel cell of FIG. 1A in accordance with one embodiment of the present invention.

FIG. 6C illustrates an ion conductive membrane fuel cell (PEMFC) architecture 120 for use in fuel cell 20 in accordance with one embodiment of the present invention. As shown, PEMFC architecture 120 comprises two bi-polar plates 44 and a membrane electrode assembly layer (or MEA) 62 sandwiched between the two bi-polar plates 44.

The MEA 62 electrochemically converts hydrogen and oxygen to water and generates electrical energy and heat in the process. Membrane electrode assembly 62 includes an anode gas diffusion layer 122, a cathode gas diffusion layer 124, a hydrogen catalyst 126, ion conductive membrane 128, anode electrode 130, cathode electrode 132, and oxygen catalyst 134.

Pressurized hydrogen gas ($H_2$) enters fuel cell 20 via hydrogen port 84, proceeds through inlet hydrogen manifold 102 and through hydrogen channels 74 of a hydrogen channel field 72a disposed on the anode face 75 of bi-polar plate 44a. The hydrogen channels 74 open to anode gas diffusion layer 122, which is disposed between the anode face 75 of bi-polar plate 44a and ion conductive membrane 128. The pressure forces hydrogen gas into the hydrogen-permeable anode gas diffusion layer 122 and across the hydrogen catalyst 126, which is disposed in the anode gas diffusion layer 122. When an $H_2$ molecule contacts hydrogen catalyst 126, it splits into two H+ions (protons) and two electrons (e−). The protons move through the ion conductive membrane 128 to combine with oxygen in cathode gas diffusion layer 124. The electrons conduct through the anode electrode 130, where they build potential for use in an external circuit (e.g., a power supply of a laptop computer) After external use, the electrons flow to the cathode electrode 132 of PEMFC architecture 120.

Hydrogen catalyst 126 breaks hydrogen into protons and electrons. Suitable catalysts 126 include platinum, ruthenium, and platinum black or platinum carbon, and/or platinum on carbon nanotubes, for example. Anode gas diffusion layer 122 comprises any material that allows the diffusion of hydrogen therethrough and is capable of holding the hydrogen catalyst 126 to allow interaction between the catalyst and hydrogen molecules. One such suitable layer comprises a woven or non-woven carbon paper. Other suitable gas diffusion layer 122 materials may comprise a silicon carbide matrix and a mixture of a woven or non-woven carbon paper and Teflon.

On the cathode side of PEMFC architecture 120, pressurized air carrying oxygen gas ($O_2$) enters fuel cell 20 via oxygen port 88, proceeds through inlet oxygen manifold 106, and through oxygen channels 76 of an oxygen channel field 72b disposed on the cathode face 77 of bi-polar plate 44b. The oxygen channels 76 open to cathode gas diffusion layer 124, which is disposed between the cathode face 77 of bi-polar plate 44b and ion conductive membrane 128. The pressure forces oxygen into cathode gas diffusion layer 124 and across the oxygen catalyst 134 disposed in the cathode gas diffusion layer 124. When an $O_2$ molecule contacts oxygen catalyst 134, it splits into two oxygen atoms. Two H+ions that have traveled through the ion selective ion conductive membrane 128 and an oxygen atom combine with two electrons returning from the external circuit to form a water molecule ($H_2O$). Cathode channels 76 exhaust the water, which usually forms as a vapor. This reaction in a single MEA layer 62 produces about 0.7 volts.

Cathode gas diffusion layer 124 comprises a material that permits diffusion of oxygen and hydrogen protons therethrough and is capable of holding the oxygen catalyst 134 to allow interaction between the catalyst 134 with oxygen and hydrogen. Suitable gas diffusion layers 124 may comprise carbon paper or cloth, for example. Other suitable gas diffusion layer 124 materials may comprise a silicon carbide matrix and a mixture of a woven or non-woven carbon paper and Teflon. Oxygen catalyst 134 facilitates the reaction of oxygen and hydrogen to form water. One common catalyst 134 comprises platinum. Many designs employ a rough and porous catalyst 134 to increase surface area of catalyst 134 exposed to the hydrogen or oxygen. For example, the platinum may reside as a powder very thinly coated onto a carbon paper or cloth cathode gas diffusion layer 124.

Ion conductive membrane 128 electrically isolates the anode from the cathode by blocking electrons from passing through membrane 128. Thus, membrane 128 prevents the passage of electrons between gas diffusion layer 122 and gas diffusion layer 124. Ion conductive membrane 128 also selectively conducts positively charged ions, e.g., hydrogen protons from gas diffusion layer 122 to gas diffusion layer 124. For fuel cell 20, protons move through membrane 128 and electrons are conducted away to an electrical load or battery. In one embodiment, ion conductive membrane 128 comprises an electrolyte. One electrolyte suitable for use with fuel cell 20 is Celtec 1000 from PEMEAS USA AG of Murray Hill, N.J. (www.pemeas.com). Fuel cells 20 including this electrolyte are generally more carbon monoxide tolerant and may not require humidification. Ion conductive membrane 128 may also employ a phosphoric acid matrix that includes a porous separator impregnated with phosphoric acid. Alternative ion conductive membranes 128 suitable for use with fuel cell 20 are widely available from companies such as United technologies, DuPont, 3M, and other manufacturers known to those of skill in the art. For example, WL Gore Associates of Elkton, Md. produces the primea Series 58, which is a low temperature MEA suitable for use with the present invention.

In one embodiment, fuel cell 20 requires no external humidifier or heat exchanger and the stack 60 only needs hydrogen and air to produce electrical power. Alternatively, fuel cell 20 may employ humidification of the cathode to fuel cell 20 improve performance. For some fuel cell stack 60 designs, humidifying the cathode increases the power and operating life of fuel cell 20.

Figure 6D:
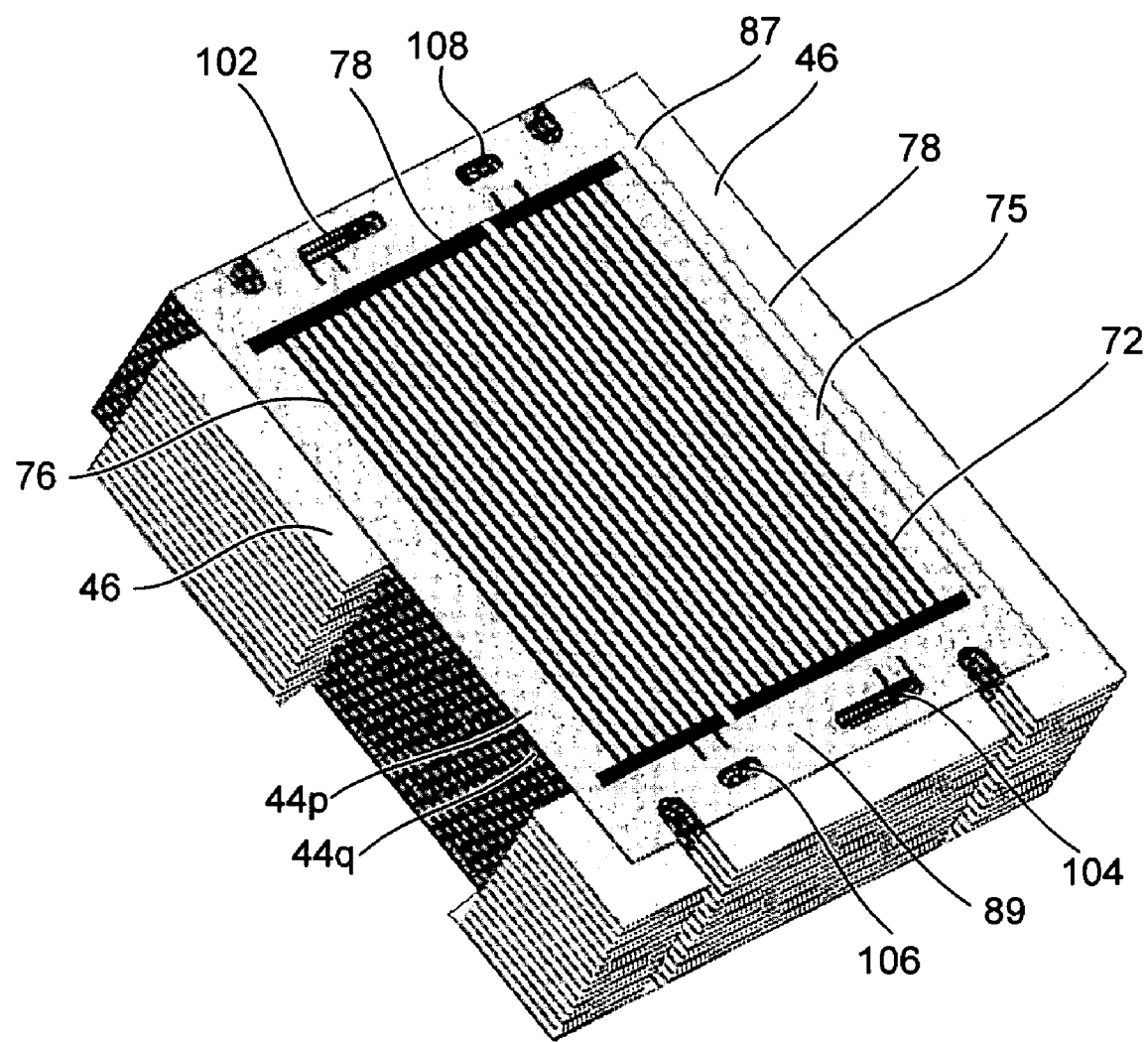
FIG. 6D illustrates a top perspective view of bi-polar plates in accordance with one embodiment of the present invention.

FIG. 6D illustrates a top perspective view of a stack of bi-polar plates (with the top two plates labeled 44p and 44q) in accordance with one embodiment of the present invention. Bi-polar plate 44 is a single plate 44 with first channel fields 72 disposed on opposite faces 75 of the plate 44.

Functionally, bi-polar plate 44 a) delivers and distributes reactant gases to the gas diffusion layers 122 and 124 and their respective catalysts, b) maintains separation of the reactant gasses from one another between MEA layers 62 in stack 60, c) exhausts electrochemical reaction byproducts from MEA layers 62, d) facilitates heat transfer to and/or from MEA layers 62 and fuel cell stack 60, and e) includes gas intake and gas exhaust manifolds for gas delivery to other bi-polar plates 44 in the fuel stack 60.

Structurally, bi-polar plate 44 has a relatively flat profile and includes opposing top and bottom faces 75a and 75b (only top face 75a is shown) and a number of sides 78. Faces 75 are substantially planar with the exception of channels 76 formed as troughs into substrate 89. Sides 78 comprise portions of bi-polar plate 44 proximate to edges of bi-polar plate 44 between the two faces 75. As shown, bi-polar plate 44 is roughly quadrilateral with features for the intake manifolds, exhaust manifolds and heat transfer appendage 46 that provide outer deviation from a quadrilateral shape.

The manifold on each plate 44 is configured to deliver a gas to a channel field on a face of the plate 44 or receive a gas from the channel field 72. The manifolds for bi-polar plate 44 include apertures or holes in substrate 89 that, when combined with manifolds of other plates 44 in a stack 60, form an inter-plate 44 gaseous communication manifold (such as 102, 104, 106 and 108). Thus, when plates 44 are stacked and their manifolds substantially align, the manifolds permit gaseous delivery to and from each plate 44.

Bi-polar plate 44 includes a channel field 72 or "flow field" on each face of plate 44. Each channel field 72 includes one or more channels 76 formed into the substrate 89 of plate 44 such that the channel rests below the surface of plate 44. Each channel field 72 distributes one or more reactant gasses to an active area for the fuel cell stack 60. Bi-polar plate 44 includes a first channel field 72a on the anode face 75a of bi-polar plate 44 that distributes hydrogen to an anode (FIG. 6C), while a second channel field on opposite cathode face 75b distributes oxygen to a cathode. Specifically, channel field 72a includes multiple channels 76 that permit oxygen and air flow to anode gas diffusion layer 122, while channel field 72b includes multiple channels 76 that permit oxygen and air flow to cathode gas diffusion layer 124. For fuel cell stack 60, each channel field 72 is configured to receive a reactant gas from an intake manifold 102 or 106 and configured to distribute the reactant gas to a gas diffusion layer 122 or 124. Each channel field 72 also collects reaction byproducts for exhaust from fuel cell 20. When bi-polar plates 44 are stacked together in fuel cell 60, adjacent plates 44 sandwich an MEA layer 62 such that the anode face 75a from one bi-polar plate 44 neighbors a cathode face 75b of an adjacent bi-polar plate 44 on an opposite side of the MEA layer 62.

Bi-polar plate 44 may include one or more heat transfer appendages 46. Each heat transfer appendage 46 permits external thermal management of internal portions of fuel cell stack 60. More specifically, appendage 46 may be used to heat or cool internal portions of fuel cell stack 60 such as internal portions of each attached bi-polar plate 44 and any neighboring MEA layers 62, for example. Heat transfer appendage 46 is laterally arranged outside channel field 72. In one embodiment, appendage 46 is disposed on an external portion of bi-polar plate 44. External portions of bi-polar plate 44 include any portions of plate 44 proximate to a side or edge of the substrate included in plate 44. External portions of bi-polar plate 44 typically do not include a channel field 72. For the embodiment shown, heat transfer appendage 46 substantially spans a side of plate 44 that does not include intake and output manifolds 102–108. For the embodiment shown in FIG. 6A, plate 44 includes two heat transfer appendages 46 that substantially span both sides of plate 44 that do not include a gas manifold. Peripherally disposing heat transfer appendage 46 allows heat transfer between inner portions of plate 44 and the externally disposed appendage 46 via the plate substrate 89.

Heat may travel to or form the heat transfer appendage 46. In other words, appendage 46 may be employed as a heat sink or source. Thus, heat transfer appendage 46 may be used as a heat sink to cool internal portions of bi-polar plate 44 or an MEA 62. Fuel cell 20 employs a cooling medium to remove heat from appendage 46. Alternatively, heat transfer appendage 46 may be employed as a heat source to provide heat to internal portions of bi-polar plate 44 or an MEA 62. In this case, a catalyst may be disposed on appendage 46 to generate heat in response to the presence of a heating medium.

For cooling, heat transfer appendage 46 permits integral conductive heat transfer from inner portions of plate 44 to the externally disposed appendage 46. During hydrogen consumption and electrical energy production, the electrochemical reaction generates heat in each MEA 62. Since internal portions of bi-polar plate 44 are in contact with the MEA 62, a heat transfer appendage 46 on a bi-polar plate 44 thus cools an MEA 62 adjacent to the plate via a) conductive heat transfer from MEA 62 to bi-polar plate 44 and b) lateral thermal communication and conductive heat transfer from central portions of the bi-polar plate 44 in contact with the MEA 62 to the external portions of plate 44 that include appendage 46. In this case, heat transfer appendage 46 sinks heat from substrate 89 between a first channel field 72 on one face 75 of plate 44 and a second channel field 72 on the opposite face of plate 44 to heat transfer appendage 46 in a direction parallel to a face 75 of plate 44. When a fuel cell stack 60 includes multiple MEA layers 62, lateral thermal communication through each bi-polar plate 44 in this manner provides interlayer cooling of multiple MEA layers 62 in stack 60—including those layers in central portions of stack 60.

Fuel cell 20 may employ a cooling medium that passes over heat transfer appendage 46. The cooling medium receives heat from appendage 46 and removes the heat from fuel cell 20. Heat generated internal to stack 60 thus conducts through bi-polar plate 44, to appendage 46, and heats the cooling medium via convective heat transfer between the appendage 46 and cooling medium. Air is suitable for use as the cooling medium.

Heat transfer appendage 46 may be configured with a thickness that is less than the thickness between opposite faces 75 of plate 44. The reduced thickness of appendages 46 on adjacent bi-polar plates 44 in the fuel cell stack 60 forms a channel between adjacent appendages. Multiple adjacent bi-polar plates 44 and appendages 46 in stack form numerous channels. Each channel permits a cooling medium or heating medium to pass therethrough and across heat transfer appendages 46. In one embodiment, fuel cell stack 60 includes a mechanical housing that encloses and protects stack 60. Walls of the housing also provide additional ducting for the cooling or heating medium by forming ducts between adjacent appendages 46 and the walls.

The cooling medium may be a gas or liquid. Heat transfer advantages gained by high conductance bi-polar plates 44 allow air to be used as a cooling medium to cool heat transfer appendages 46 and stack 60. For example, a dc-fan 37 may be attached to an external surface of the mechanical housing. The fan 37 moves air through a hole in the mechanical housing, through the channels between appendages to cool heat transfer appendages 46 and fuel cell stack 60, and out an exhaust hole or port in the mechanical housing. Fuel cell system 10 may then include active thermal controls based on temperature sensed feedback. Increasing or decreasing coolant fan speed regulates the amount of heat removal from stack 60 and the operating temperature for stack 60. In one embodiment of an air-cooled stack 60, the coolant fan speed increases or decreases as a function of the actual cathode exit temperature, relative to a desired temperature set-point.

For heating, heat transfer appendage 46 allows integral heat transfer from the externally disposed appendage 46 to inner portions of plate 44 and any components and portions of fuel cell 20 in thermal communication with inner portions of plate 44. A heating medium passed over the heat transfer appendage 46 provides heat to the appendage. Heat convected onto the appendage 46 then conducts through the substrate 89 and into internal portions of plate 44 and stack 60, such as portions of MEA 62 and its constituent components.

In one embodiment, the heating medium comprises a heated gas having a temperature greater than that of appendage 46. Exhaust gases from heater 30 or reformer 32 of fuel processor 15 may each include elevated temperatures that are suitable for heating one or more appendages 46.

In another embodiment, fuel cell comprises a catalyst 192 (FIG. 6A) disposed in contact with, or in proximity to, one or more heat transfer appendages 46. The catalyst 192 generates heat when the heating medium passes over it. The heating medium in this case may comprise any gas or fluid that reacts with catalyst 192 to generate heat. Typically, catalyst 192 and the heating medium employ an exothermic chemical reaction to generate the heat. Heat transfer appendage 46 and plate 44 then transfer heat into the fuel cell stack 60, e.g. to heat internal MEA layers 62. For example, catalyst 192 may comprise platinum and the heating medium includes the hydrocarbon fuel source 17. The fuel source 17 may be heated to a gaseous state before it enters fuel cell 20. This allows gaseous transportation of the heating medium and gaseous interaction between the fuel source 17 and catalyst 192 to generate heat. Similar to the cooling medium described above, a fan disposed on one of the walls then moves the gaseous heating medium within fuel cell 20.

In a specific embodiment, the hydrocarbon fuel source 17 used to react with catalyst 192 comes from a reformer exhaust (see FIG. 1C, line 35) or heater exhaust in fuel processor 15. This advantageously pre-heats the fuel source 17 before receipt within fuel cell 20 and also efficiently uses or burns any fuel remaining in the reformer or heater exhaust after processing by fuel processor 15. Alternatively, fuel cell 20 may include a separate hydrocarbon fuel source 17 feed that directly supplies hydrocarbon fuel source 17 to fuel cell 20 for heating and reaction with catalyst 192. In this case, catalyst 192 may comprise platinum. Other suitable catalysts 192 include palladium, a platinum/ palladium mix, iron, ruthenium, and combinations thereof. Each of these will react with a hydrocarbon fuel source 17 to generate heat. Other suitable heating mediums include hydrogen or any heated gases emitted from fuel processor 15, for example.

When hydrogen is used as the heating medium, catalyst 192 comprises a material that generates heat in the presence of hydrogen, such as palladium or platinum. As will be described in further detail below, the hydrogen may include hydrogen supplied from the reformer 32 in fuel processor 15 as exhaust.

As shown in FIG. 6A, catalyst 192 is arranged on, and in contact with, each heat transfer appendage 46. In this case, the heating medium passes over each appendage 46 and reacts with catalyst 192. This generates heat, which is absorbed via conductive thermal communication by the cooler appendage 46. Wash coating may be employed to dispose catalyst 192 on each appendage 46. A ceramic support may also be used to bond catalyst 192 on an appendage 46.

For catalyst-based heating, heat then a) transfers from catalyst 192 to appendage 46, b) moves laterally though bi-polar plate 44 via conductive heat transfer from lateral portions of the plate that include heat transfer appendage 46 to central portions of bi-polar plate 44 in contact with the MEA layers 62, and c) conducts from bi-polar plate 44 to MEA layer 62. When a fuel cell stack 60 includes multiple MEA layers 62, lateral heating through each bi-polar plate 44 provides interlayer heating of multiple MEA layers 62 in stack 60, which expedites fuel cell 20 warm up.

Bi-polar plates 44 of FIG. 6A include heat transfer appendages 46 on each side. In this case, one set of heat transfer appendages 46a is used for cooling while the other set of heat transfer appendages 46b is used for heating. Bi-polar plates 44 illustrated in FIG. 6D show plates 44 with four heat transfer appendages 46 disposed on three sides of stack 60. Appendage 46 arrangements can be otherwise varied to affect and improve heat dissipation and thermal management of fuel cell stack 60 according to other specific designs. For example, appendages 46 need not span a side of plate 44 as shown and may be tailored based on how the heating fluid is channeled through the housing.

Although the present invention provides a bi-polar plate 44 having channel fields 72 that distribute hydrogen and oxygen on opposing sides of a single plate 44, many embodiments described herein are suitable for use with conventional bi-polar plate assemblies that employ two separate plates for distribution of hydrogen and oxygen.

While the present invention has mainly been discussed so far with respect to a reformed methanol fuel cell (RMFC), the present invention may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively, channels the fuel into the fuel cell stack 60 and processes the liquid fuel to separate hydrogen for electrical energy generation. For a DMFC, channel fields 72 in the bi-polar plates 44 distribute liquid methanol instead of hydrogen. Hydrogen catalyst 126 described above would then comprise a suitable anode catalyst for separating hydrogen from methanol. Oxygen catalyst 128 would comprise a suitable cathode catalyst for processing oxygen or another suitable oxidant used in the DMFC, such as peroxide. In general, hydrogen catalyst 126 is also commonly referred to as an anode catalyst in other fuel cell architectures and may comprise any suitable catalyst that removes hydrogen for electrical energy generation in a fuel cell, such as directly from the fuel as in a DMFC. In general, oxygen catalyst 128 may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst 126, cathode catalyst 128, anode fuel and oxidant according to a specific SOFC, PAFC or MCFC design.

Fuel Processor

Figure 7A:
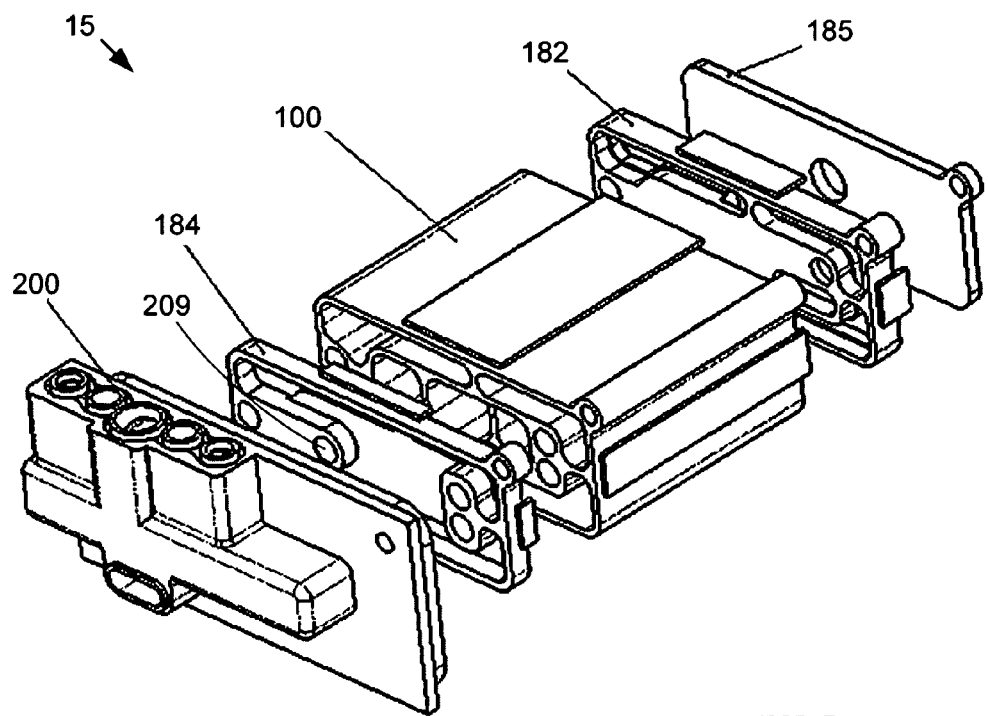
FIG. 7A illustrates an outer top perspective view of a fuel processor used in the fuel cell system of FIG. 1A.

FIG. 7A illustrates a perspective view of components included in a fuel processor 15 in accordance with one embodiment of the present invention. FIG. 3B illustrates a cross-sectional front view of monolithic structure 100. Fuel processor 15 reforms methanol to produce hydrogen. Fuel processor 15 comprises monolithic structure 100, end plates 182 and 184, end plate 185, reformer 32, heater 30, boiler 34, boiler 108, dewar 150 and housing 152. Although the present invention will now be described with respect to methanol consumption for hydrogen production, it is understood that fuel processors of the present invention may consume another fuel source.

As the term is used herein, 'monolithic' refers to a single and integrated structure that includes at least portions multiple components used in fuel processor 15. As shown in FIG. 3B, monolithic structure 100 includes reformer 32, burner 30, boiler 34 and boiler 108. Monolithic structure 100 also includes associated plumbing inlets and outlets for reformer 32, burner 30 and boiler 34 disposed on end plates 182 and 184 and interconnect 200. Monolithic structure 100 comprises a common material 141 that constitutes the structure. The monolithic structure 100 and common material 141 simplify manufacture of fuel processor 15. For example, using a metal for common material 141 allows monolithic structure 100 to be formed by extrusion. In a specific embodiment, monolithic structure 100 is consistent in cross sectional dimensions between end plates 182 and 184 and solely comprises copper formed in a single extrusion.

Figure 7B:
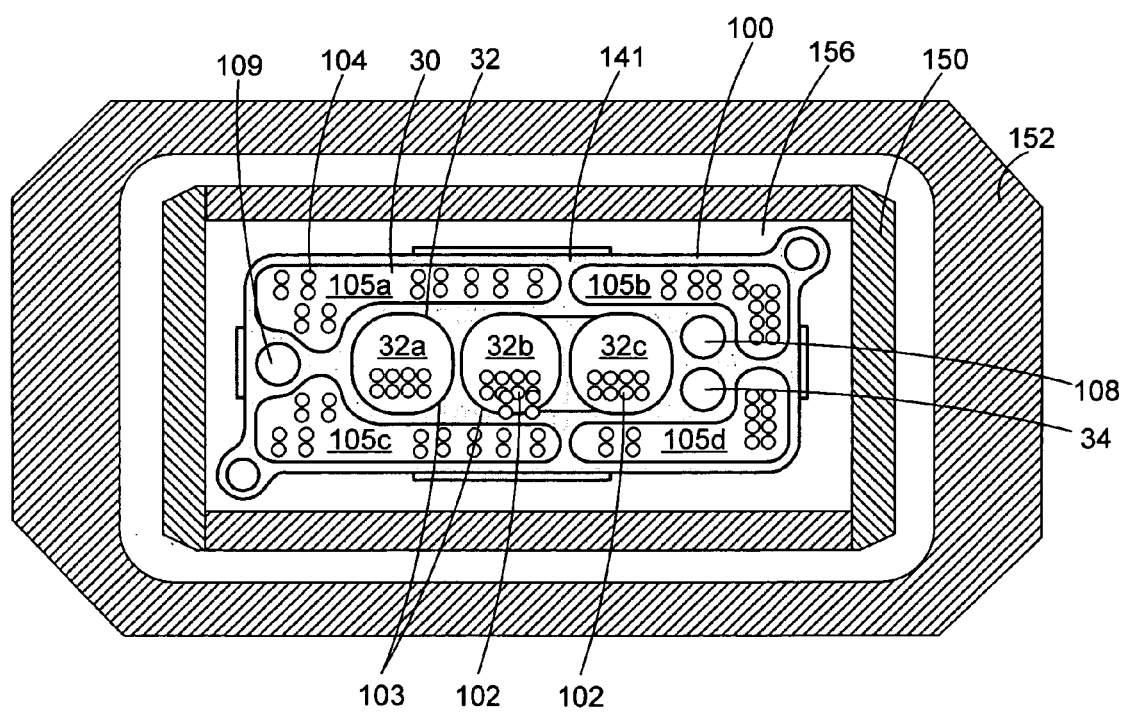
FIG. 7B illustrates a cross-sectional front view of a main component in the fuel processor used in the fuel cell system of FIG. 1A taken through a mid-plane of fuel processor.

Referring to FIG. 7B, housing 152 provides mechanical protection for internal components of fuel processor 15 such as burner 30 and reformer 32. Housing 152 also provides separation from the environment external to processor 15 and includes inlet and outlet ports for gaseous and liquid communication in and out of fuel processor 15. Housing 152 includes a set of housing walls that at least partially contain a dewar 150 and provide external mechanical protection for components in fuel processor 15. The walls may comprises a suitably stiff material such as a metal or a rigid polymer, for example. Dewar 150 improves thermal heat management for fuel processor 15 by a) allowing incoming air to be pre-heated before entering burner 30, b) dissipating heat generated by burner 32 into the incoming air before the heat reaches the outside of housing 152.

Boiler 34 heats methanol before reformer 32 receives the methanol. Boiler 34 receives methanol via a fuel source inlet on interconnect 200, which couples to a methanol supply line 27 (FIG. 1C). Since methanol reforming and hydrogen production via a catalyst 102 in reformer 32 often requires elevated methanol temperatures, fuel processor 15 pre-heats the methanol before receipt by reformer 32 via boiler 34. Boiler 34 is disposed in proximity to burner 30 to receive heat generated in burner 30. The heat transfers via conduction through monolithic structure from burner 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Walls 111 in monolithic structure 100 and end walls 113 on end plates 182 and 184 define dimensions for a reformer chamber 103. In one embodiment, end plate 182 and/or end plate 184 includes a channel that routes heated methanol exhausted from boiler 34 into reformer 32.

In one embodiment, a reformer includes a multi-pass arrangement. Reformer 32 includes three multi-pass portions that process methanol in series: chamber section 32a, chamber section 32b, and chamber section 32c. A reformer chamber 103 then includes the volume of all three sections 32a–c. Each section traverses the length of monolithic structure 100; and opens to each other in series such that sections 32a–c form one continuous path for gaseous flow. More specifically, heated and gaseous methanol from boiler 34a) enters reformer chamber section 32a at an inlet end of monolithic structure 100 and flows to the other end over catalyst 102 in section 32a, b) then flows into chamber section 32b at the second end of monolithic structure 100 and flows to the inlet end over catalyst 102 in section 32b, and c) flows into chamber section 32c at one end of monolithic structure 100 and flows to the other end over catalyst 102 in the chamber section 32c.

Reformer 32 includes a catalyst 102 that facilitates the production of hydrogen. Catalyst 102 reacts with methanol and produces hydrogen gas and carbon dioxide. In one embodiment, catalyst 102 comprises pellets packed to form a porous bed or otherwise suitably filled into the volume of reformer chamber 103. Pellet diameters ranging from about 50 microns to about 1.5 millimeters are suitable for many applications. Pellet diameters ranging from about 500 microns to about 1 millimeter are suitable for use with reformer 32. Pellet sizes may be varied relative to the cross sectional size of reformer sections 32a–c, e.g., as the reformer sections increase in size so does catalyst 102 pellet diameters. Pellet sizes and packing may also be varied to control the pressure drop that occurs through reformer chamber 103. In one embodiment, pressure drops from about 0.2 to about 2 psi gauge are suitable between the inlet and outlet of reformer chamber 103. One suitable catalyst 102 may include CuZn coated onto alumina pellets when methanol is used as a hydrocarbon fuel source 17. Other materials suitable for catalyst 102 include platinum, palladium, a platinum/ palladium mix, nickel, and other precious metal catalysts for example. Catalyst 102 pellets are commercially available from a number of vendors known to those of skill in the art. Catalyst 102 may also comprise catalyst materials listed above coated onto a metal sponge or metal foam. A wash coat of the desired metal catalyst material onto the walls of reformer chamber 103 may also be used for reformer 32.

Reformer 32 is configured to output hydrogen and includes an outlet port 209 that communicates hydrogen formed in reformer 32 outside of fuel processor 15. Port 209 is disposed on a wall of end plate 184 and includes a hole that passes through the wall. Port 209 opens to hydrogen line in interconnect 200, which then forms part of a hydrogen provision line 39. Line 39 communicates the hydrogen to the anode of fuel cell 20 for electrical energy generation.

Hydrogen production in reformer 32 is slightly endothermic and draws heat from burner 30. Burner 30 generates heat and is configured to provide heat to reformer 32. As shown in FIG. 3B, burner 30 comprises four burner chambers 105a–d that surround reformer 32. In one embodiment, burner 30 uses electrical resistance and electrical energy to produce heat.

In the embodiment shown, burner 30 employs catalytic combustion to produce heat. As the term is used herein, a burner refers to a heater that uses a catalytic heating process to generate heat. A heater in a fuel processor of the present invention may alternatively employ electrical heating, for example. A catalyst 104 disposed in each burner chamber 105 helps a burner fuel passed through the chamber generate heat. Burner 30 includes an inlet that receives methanol 17 from boiler 108 via a channel in one of end plates 182 or 184. In one embodiment, methanol produces heat in burner 30 and catalyst 104 facilitates the methanol production of heat. In another embodiment, waste hydrogen from fuel cell 20 produces heat in the presence of catalyst 104. Suitable burner catalysts 104 may include platinum or palladium coated onto alumina pellets for example. Other materials suitable for catalyst 104 include iron, tin oxide, other noble-metal catalysts, reducible oxides, and mixtures thereof. Catalyst 104 is commercially available from a number of vendors known to those of skill in the art as small pellets. The pellets that may be packed into burner chamber 105 to form a porous bed or otherwise suitably filled into the burner chamber volume. Catalyst 104 pellet sizes may be varied relative to the cross sectional size of burner chamber 105. Catalyst 104 may also comprise catalyst materials listed above coated onto a metal sponge or metal foam or wash coated onto the walls of burner chamber 105.

Some fuel sources generate additional heat in burner 30, or generate heat more efficiently, with elevated temperatures. Fuel processor 15 includes a boiler 108 that heats methanol before burner 30 receives the fuel source. In this case, boiler 108 receives the methanol via fuel source inlet 85. Boiler 108 is disposed in proximity to burner 30 to receive heat generated in burner 30. The heat transfers via conduction through monolithic structure from burner 30 to boiler 108 and via convection from boiler 108 walls to the methanol passing therethrough.

Air including oxygen enters fuel processor 15 via air inlet port 91. Burner 30 uses the oxygen for catalytic combustion of methanol. A burner 30 in fuel processor 15 generates heat and typically operates at an elevated temperature. In one embodiment, fuel processor 15 comprises a dewar 150 to improve thermal management for fuel processor 15. Dewar 150 at least partially thermally isolates components internal to housing 152—such as burner 30—and contains heat within fuel processor 15. Dewar 150 is configured such that air passing through dewar chamber 156 receives heat generated in burner 30. Dewar 150 offers thus two functions for fuel processor 15: a) it permits active cooling of components within fuel processor 15 before the heat reaches an outer portion of the fuel processor, and b) it pre-heats the air going to burner 30. Air first passes along the outside of dewar 150 before passing through apertures in the dewar and along the inside of dewar 150. This heats the air before receipt by air inlet port 93 of burner 30.

In one embodiment, the fuel cell system runs anode exhaust from the fuel cell 20 back to fuel processor. As shown in FIG. 1C, line 38 routes unused hydrogen from fuel cell 20 burner inlet 109, which provides the anode exhaust to burner 30 (or to the regenerator 36 and then to burner inlet 109 and into burner 30). Burner 30 includes a thermal catalyst that reacts with the unused hydrogen to produce heat. Since hydrogen consumption within fuel cell 20 is often incomplete and the anode exhaust often includes unused hydrogen, re-routing the anode exhaust to burner 30 allows the fuel cell system to capitalize on unused hydrogen in fuel cell 20 and increase hydrogen usage and efficiency. The fuel cell system thus provides flexibility to use different fuels in a catalytic burner 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures.

Burner inlet 109 traverses monolithic structure 100 and carries anode exhaust from fuel cell 20 before provision into burner 30. Disposing burner inlet 109 adjacent to a burner chamber 105 also heats the incoming anode exhaust, which reduces heat transferred to the anode exhaust in the burner chamber 105.

In another embodiment, the fuel cell system runs a heating medium from fuel processor 15 to fuel cell 20 to provide heat to fuel cell 20. In this case, the fuel cell system includes plumbing configured to transport the heating medium from fuel processor 15 to fuel cell 20. As the term is used herein, plumbing may comprise any tubing, piping and/or channeling that communicates a gas or liquid from one location to a second location. The plumbing may also comprise one or more valves, gates or other devices to facilitate and control flow.

In a specific embodiment, line 35 transports heated gases to fan 37, which moves the heated gases within fuel cell 20 and across the fuel cell stack and heat transfer appendages (FIG. 1C). Alternatively, the plumbing may be configured to transport the heating medium from burner 30 to one or more heat transfer appendages. In this case, line 35 may continue through the fuel cell housing and open in the proximity of one or more heat transfer appendages. A hole in the fuel cell housing then allows line 35 to pass therethrough or connect to a port that communicates the gases to plumbing inside the fuel cell for delivery to the fuel cell stack and heat transfer appendage. For catalytic heat generation in fuel cell 20, the plumbing may also transport the heating medium to facilitate gaseous interaction with the catalyst, such as plumbing delivery to one or more bulkheads.

In one embodiment, the heating medium comprises heated gases exhausted from burner 30. A catalytic burner or electrical resistance burner operates at elevated temperatures. Cooling air exhausted from an electric burner or product gases exhausted from a catalytic burner are often greater than about 100 degrees Celsius when the gases leaves the fuel processor. For many catalytic burners, depending on the fuel source employed, the heating medium is commonly greater than about 200 degrees Celsius when the heating medium leaves the fuel processor. These heated gases are transported to the fuel cell for convective heat transfer in the fuel cell, such as passing the heated gases over one or more heat transfer appendages 46 for convective heat transfer from the warmer gases into the cooler heat transfer appendages.

In another embodiment, burner 30 is a catalytic burner and the heating medium comprises the fuel source. Catalytic combustion in burner 30 is often incomplete and the burner exhaust gases include unused and gaseous methanol. Fuel cell 20 then comprises a thermal catalyst that facilitates production of heat in the fuel cell in the presence of methanol. The fuel source is typically vaporized prior to reaching the burner to facilitate catalytic combustion. In this case, line 35 transports the gaseous and unused methanol to the thermal catalyst in fuel cell 20. Several suitable thermal catalyst arrangements for transferring heat into heat transfer appendages 46 are described below (FIG. 6A). Suitable methanol catalysts, such as platinum or palladium coated onto alumina pellets, are also described above with respect to catalyst 104 in burner 30.

In one embodiment, the heating medium is transported to the fuel cell during a start-up period before the fuel cell begins generating electrical energy, e.g., in response to a request for electrical energy. Heating a fuel cell in this manner allows fuel cell component operating temperatures to be reached sooner and expedites warm-up time needed when initially turning on fuel cell 20. In another embodiment, the heating medium is transported from the fuel processor to the fuel cell during a period of non-activity in which the fuel cell does not generate electrical energy and the component cools. Since many fuel cells require elevated temperatures for operation and the electrical energy generating process is exothermic, the fuel cell usually does not require external heating during electrical energy generation. However, when electrical energy generation ceases for an extended time and the component drops below a threshold operating temperature, the heating medium may then be transported from the fuel processor to regain the operating temperature and resume electrical energy generation. This permits operating temperatures in a fuel cell to be maintained when electrical energy is not being generated by the fuel cell.

A fuel cell package may include other fuel processor designs. Many architectures employ a planar reformer disposed on top or below to a planar burner. Micro-channel designs fabricated in silicon commonly employ such stacked planar architectures may be used. Other fuel processors may be used that process fuel sources other than methanol. Fuel sources other than methanol were listed above, and processors for these fuels are not detailed herein for sake of brevity.

While this invention has been described in terms of several preferred embodiments, there are alterations, permutations, and equivalents that fall within the scope of this invention which have been omitted for brevity's sake. For example, although the present invention has described fluid delivery systems and methods operating in a fuel cell system and package, many of the methods and techniques described herein are suitable for use with other micro-fluidics applications such as delivery of fluids in medical applications, CPU cooling, ink delivery, electronics cooling and scientific applications required accurate control over low fluid flow rates. Thus, fluid control according to the present invention is not limited to use in a fuel cell system. It is therefore intended that the scope of the invention should be determined with reference to the appended claims.

What is claimed is:

1. A fuel cell system for generating electrical energy, the fuel cell system comprising:
 a differential flow meter that includes a flow restriction and at least one sensor configured to measure differential pressure in a fluid between two locations of the differential flow meter, wherein the at least one sensor is configured to measure the differential pressure in the fluid before and after the fluid passes the flow restriction;
 a pressure source disposed before the differential flow meter in a flow path for the fluid and configured to move the fluid to the differential flow meter before receipt of the fluid by a fuel processor included in the fuel cell system;
 a controller configured to convert a signal output by the sensor to a command that affects flow rate of the fluid; and
 a fuel cell configured to receive oxygen and hydrogen and to generate electrical energy,
 wherein the fluid is a liquid and the pressure source is configured to move the fluid at a flow rate that is less than about 200 milliliters per hour.

2. The fuel cell system of claim 1 wherein the flow restriction includes an orifice with a smaller opening than a line that supplies the fluid to the flow restriction.

3. The fuel cell system of claim 1 wherein the differential flow meter includes a tube.

4. The fuel cell system of claim 3 wherein the tube is coiled.

5. The fuel cell system of claim 3 where the pressure restriction is en integral part of the fuel cell system and does not substantially increase pressure drop for the fluid.

6. The fuel cell system of claim 1 further comprising a circuit board that the at least one sensor and the controller are attached to.

7. The fuel cell system of claim 1 further comprising a temperature sensor configured to detect temperature of the fluid.

8. The fuel cell system of claim 7 wherein the fluid includes liquid methanol.

9. The fuel cell system of claim 1 wherein to pressure source includes one of: a pump or a pressurized bladder in a storage device that stores the fluid.

10. The fuel cell system of claim 9 wherein the pump is a gear pump.

11. The fuel cell system of claim 1 wherein the fluid is processed by the fuel processor to provide hydrogen.

12. The fuel cell system of claim 1 wherein the fluid is a liquid and the pressure source is configured to move the liquid at a flow rate that is less than about 4 milliliters per hour per watt output by the fuel cell.

13. The fuel cell system of claim 12 wherein the fluid is a liquid and to pressure source is configured to move the liquid at a flow rate that is less than about 1 milliliter per hour per watt output by the fuel cell.

14. The fuel cell system of claim 1 wherein the fuel cell is configured to output less than 200 watts of power.

15. A fuel cell system for generating electrical energy, the fuel cell system comprising:
a storage device that stores a fuel source;
fuel processor configured to process the fuel source to output hydrogen;
a differential flow meter that includes a flow restriction and at least one sensor configured to measure differential pressure in the fuel source between two locations of the differential flow meter, wherein the at least one sensor is configured to measure the differential pressure in the fuel source before and after the fuel source passes the flow restriction;
a pressure source configured to move the fuel source from the storage device to the differential flow meter before receipt of the fuel source in the fuel processor;
a controller configured to convert a signal output by the sensor to a command that affects flow rate of the fuel source; and
a fuel cell configured to receive hydrogen provided by the fuel processor and to generate electrical energy using oxygen and the hydrogen,
wherein the fuel source is a liquid and the pressure source is configured to move the fluid at a flow rate that is less than about 200 milliliters per hour.

16. The fuel cell system of claim 15 wherein the differential flow meter includes a coiled tube.

17. The fuel cell system of claim 15 further comprising a circuit board that the at least one sensor and the controller are attached to.

18. The fuel cell system of claim 15 further comprising a temperature sensor configured to detect temperature of the fuel source.

19. The fuel cell system of claim 18 wherein the fuel source includes liquid methanol.

20. The fuel cell system of claim 15 wherein to pressure source includes one of: a pump or a pressurized bladder in the storage device.

21. The fuel cell system of claim 20 wherein to pump is a gear pump.

22. The fuel cell system of claim 20 wherein the pump is configured to consume less than about 2 watts when moving the fuel source.

23. The fuel cell system of claim 15 wherein the fluid is a liquid and the pressure source is configured to move the liquid at a flow rate that is less than about 4 milliliters per hour per watt output by the fuel cell.

24. The fuel cell system of claim 23 wherein the liquid is methanol and the pressure source is configured to move the liquid at a flow rate that is less than about 1 milliliter per hour per watt output by the fuel cell.

25. A fuel cell system for generating electrical energy, the system comprising:
a storage device that stores hydrogen;
a fuel cell configured to receive oxygen and the hydrogen and to generate electrical energy;
a differential flow meter that includes a flow restriction and at least one sensor configured to measure differential pressure in the hydrogen between two locations of the differential flow meter, wherein the at least one sensor is configured to measure the differential pressure in the fluid before and after the fluid passes the flow restriction;
a pressure source configured to move the hydrogen from the storage device to the differential flow meter before receipt of the hydrogen by a fuel processor included in the fuel cell,
wherein the pressure source is configured to move the hydrogen at a flow raw that is less than about 60 milliliters per minute per watt output by the fuel cell; and
a controller configured to convert a signal output by the sensor to a command that affects flow rate of the fuel source.

26. The fuel cell system of claim 25 wherein the flow restriction includes an orifice with a smaller opening than a line that supplies the fluid to the flow restriction.

27. The fuel cell system of claim 26 where the pressure restriction is an integral part of the fuel cell system and does not substantially increase pressure drop for the fluid.

28. The fuel cell system of claim 25 further comprising a circuit board that the at least one sensor and the controller are attached to.

29. The fuel cell system of claim 25 further comprising a temperature sensor configured to detect temperature of the fluid.

30. The fuel cell system of claim 25 wherein the fuel cell is configured to output less than 200 watts of power.

* * * * *

UNITED STATES PATENT AND TRADEMARK OFFICE
CERTIFICATE OF CORRECTION

PATENT NO. : 7,205,060 B2  
APPLICATION NO. : 11/193303  
DATED : April 17, 2007  
INVENTOR(S) : Kaye et al.

It is certified that error appears in the above-identified patent and that said Letters Patent is hereby corrected as shown below:

Column 6, line 39, change "111" to --11--.

Column 15, line 10, delete "-" after line.

In line 2 of claim 5 [column 32, line 45] change "en" to --an--.

In line 1 of claim 9 [column 32, line 55] change "to" to --the--.

In line 2 of claim 13 [column 32, line 66] change "to" to --the--.

In line 1 of claim 20 [column 33, line 39] change "to" to --the--.

In line 1 of claim 21 [column 33, line 42] change "to" to --the--.

In line 18 of claim 25 [column 34, line 26] change "raw" to --rate--.

Signed and Sealed this

Twenty-ninth Day of April, 2008

JON W. DUDAS  
*Director of the United States Patent and Trademark Office*